United States Patent
Eres

(12) United States Patent (10) Patent No.: US 7,811,632 B2
Eres (45) Date of Patent: Oct. 12, 2010

(54) MOLECULAR JET GROWTH OF CARBON NANOTUBES AND DENSE VERTICALLY ALIGNED NANOTUBE ARRAYS

(75) Inventor: Gyula Eres, Knoxville, TN (US)

(73) Assignee: UT-Battelle LLC, Oak Ridge, TN (US)

( * ) Notice: Subject to any disclaimer, the term of this patent is extended or adjusted under 35 U.S.C. 154(b) by 763 days.

(21) Appl. No.: 11/040,919

(22) Filed: Jan. 21, 2005

(65) Prior Publication Data
US 2006/0165585 A1 Jul. 27, 2006

(51) Int. Cl.
*C23C 16/00* (2006.01)
*C23C 16/26* (2006.01)

(52) U.S. Cl. ............... 427/248.1; 427/249.1; 427/249.6

(58) Field of Classification Search .................. None
See application file for complete search history.

(56) References Cited

U.S. PATENT DOCUMENTS

| | | | |
|---|---|---|---|
| 4,938,996 A * | 7/1990 | Ziv et al. | 427/597 |
| 5,085,885 A * | 2/1992 | Foley et al. | 427/575 |
| 6,232,706 B1 * | 5/2001 | Dai et al. | 313/309 |
| 6,764,874 B1 * | 7/2004 | Zhang et al. | 438/99 |
| 2002/0136683 A1 * | 9/2002 | Smalley et al. | 423/461 |
| 2004/0009115 A1 * | 1/2004 | Wee et al. | 423/447.3 |

OTHER PUBLICATIONS

R.H. Baughman, et al., "Carbon Nanotubes—the Route Toward Applications," Science, 2002, pp. 787-792, vol. 297.
K. Hata, et al., "Water-Assisted Highly Efficient Synthesis of Impurity-Free Single-Walled Carbon Nanotubes," Science, 2004, pp. 1362-1364, vol. 306.

* cited by examiner

Primary Examiner—Michael Cleveland
Assistant Examiner—Michael G Miller
(74) Attorney, Agent, or Firm—Scully, Scott, Murphy & Presser, P.C.

(57) ABSTRACT

A method of growing a carbon nanotube includes the step of impinging a beam of carbon-containing molecules onto a substrate to grow at least one carbon nanotube on the catalyst surface.

7 Claims, 24 Drawing Sheets

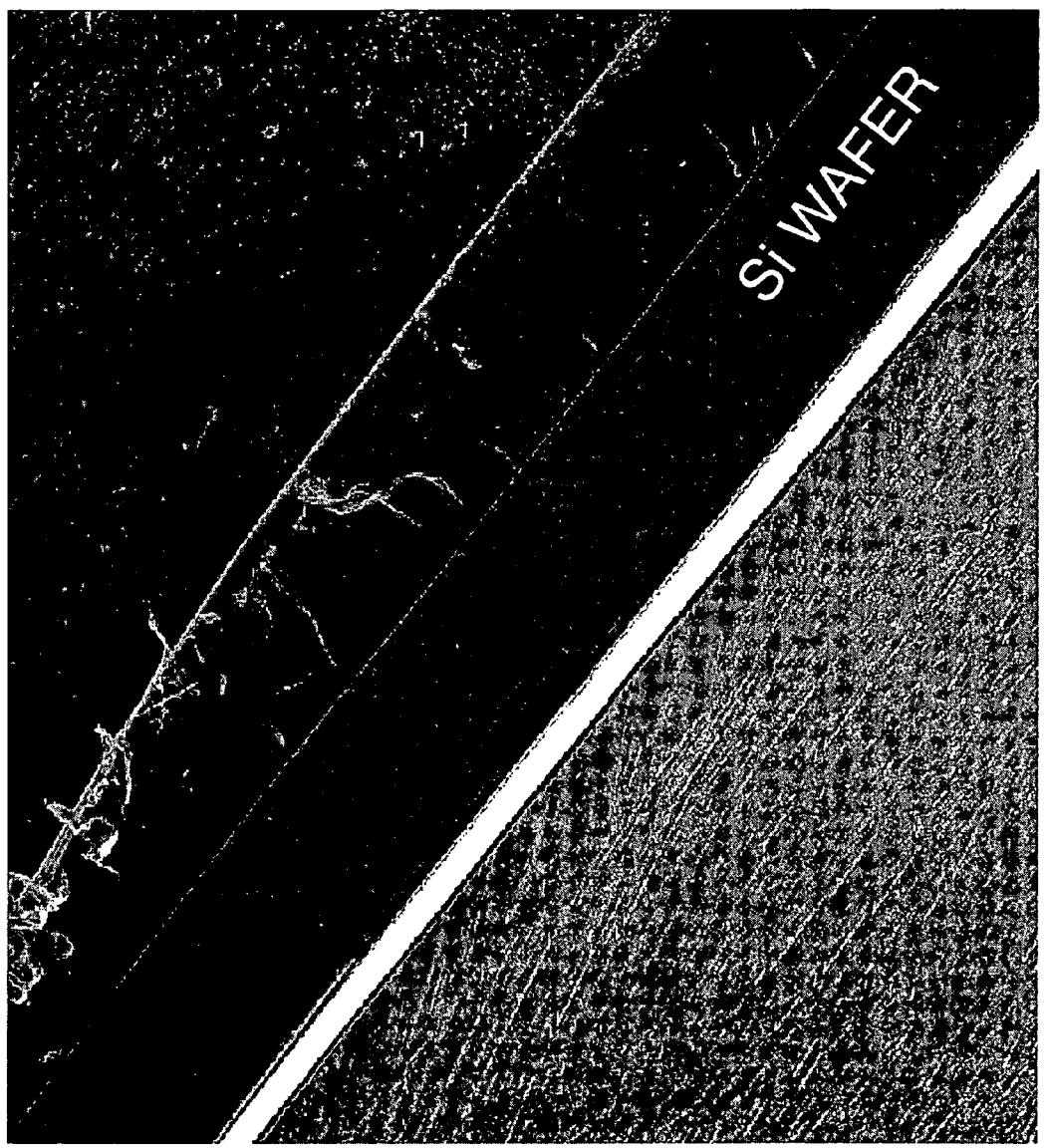

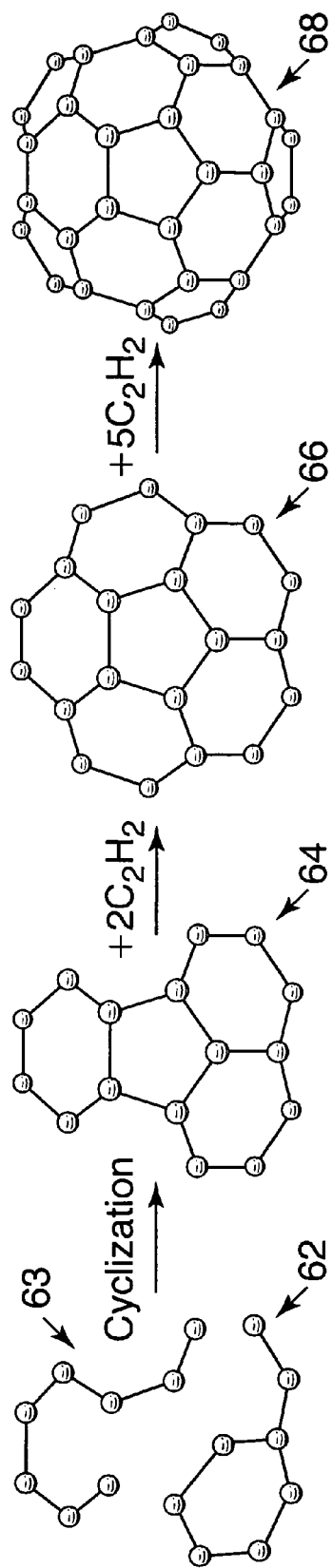
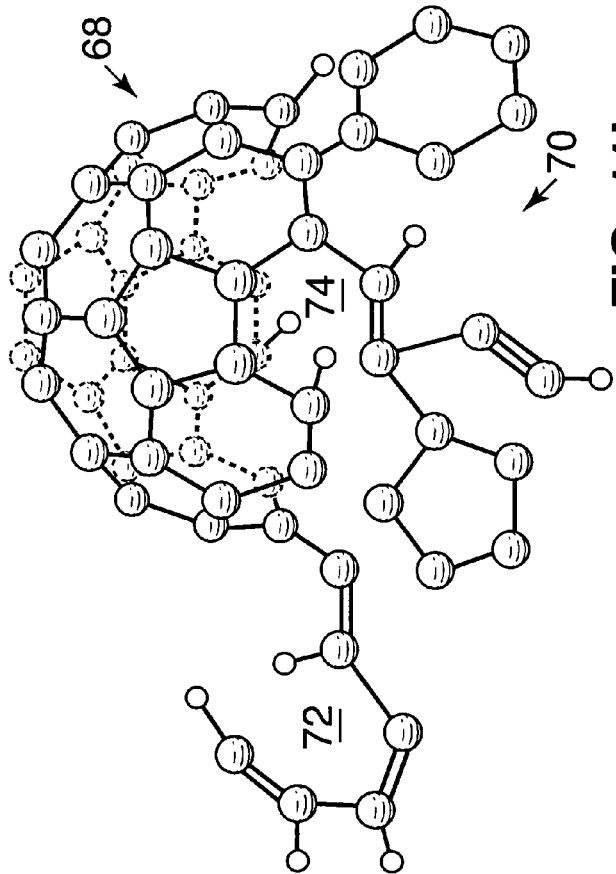
FIG. 11a
FIG. 11b
○ Carbon Atom
○ Hydrogen Atom

MOLECULAR JET GROWTH OF CARBON NANOTUBES AND DENSE VERTICALLY ALIGNED NANOTUBE ARRAYS

The United States Government has rights in this invention pursuant to contract no. DE-AC05-00OR22725 between the United States Department of Energy and UT-Battelle, LLC.

FIELD OF THE INVENTION

The present invention relates to methods of growing carbon nanotubes, and more particularly to molecular jet methods of growing carbon nanotubes.

BACKGROUND OF THE INVENTION

Chemical vapor deposition (CVD) is currently regarded as the only feasible method capable of producing carbon nanotube structures (CNT) as well as bulk quantities of single-wall carbon nanotubes (SWCNT), double-wall carbon nanotubes (DWCNT), and multi-wall carbon nanotubes (MWCNT). For many applications it is particularly desirable to produce vertically aligned (VA) CNTs. CVD is generally carried out by bulk flow and decomposition of carbon containing gas molecules over small transition metal particles (nanoparticles).

A disadvantage associated with CVD methods is the lack of control over the outcome of the decomposition reaction, originating from two factors. Firstly, in a CVD reactor the heat flow and the mass flow are coupled with the reaction kinetics. Secondly, the CVD growth environment is accompanied by a large number of intermediates formed by homogeneous gas phase reactions. The growth species in CVD must diffuse through a stagnant diffusion layer and the input concentration is no longer related to the concentration of the growth species in a straightforward fashion. Moreover, the homogeneous gas phase reactions produce undesirable byproducts such as amorphous carbon, carbonaceous particles, fullerenes, soot, and inactive metal catalyst particles encapsulated with carbon.

CVD byproducts must be removed by post growth processing to obtain material that is sufficiently pure to be useful for applications. The purification processes are time consuming and expensive, and they consume more than 90% of the material. Currently, the post growth purification efforts take up more time, and are more expensive than the growth process itself.

OBJECTS OF THE INVENTION

Accordingly, objects of the present invention include methods of growing CNT, and particularly SWCNT by a controllable process wherein the heat flow and the mass flow are not coupled with the reaction kinetics, a process that does not require the formation of a large number of intermediate products, and a process that does not result in large amounts of deleterious byproducts. Further and other objects of the present invention will become apparent from the description contained herein.

SUMMARY OF THE INVENTION

In accordance with one aspect of the present invention, the foregoing and other objects are achieved by a method of growing a carbon nanotube that includes the step of impinging a beam of carbon-containing molecules onto a substrate to grow at least one carbon nanotube on the substrate.

BRIEF DESCRIPTION OF THE DRAWINGS

FIG. 2a is a low resolution SEM image of a molecular jet-grown CNT film in accordance with the present invention.

FIG. 4c shows an enlarged D and G band region of spectra collected from the top of the film shown in FIG. 4a.

FIG. 11a is a top view of a schematic illustration of probable reactions and intermediates to CNT nucleus formation.

FIG. 11b is an oblique side view of a schematic illustration of probable mechanism of CNT formation.

For a better understanding of the present invention, together with other and further objects, advantages and capabilities thereof, reference is made to the following disclosure and appended claims in connection with the above-described drawings.

DETAILED DESCRIPTION OF THE INVENTION

Growing CNTs by molecular jet growth (MJG) methods in accordance with the present invention provide control capabilities that come with using a jet of molecules (also called a molecular beam or molecular jet) instead of the bulk gas flow of CVD methods. In the molecular beam environment the mass input (the source gas) and the energy input (the substrate temperature) are independent of each other. The separation of the gas temperature and the substrate temperature from each other enables independent control of these and other related growth variables. Because the source gas molecules are transported from the source to substrate in a form of a beam, the number of growth molecules that undergo more than a single collision with the substrate is negligible. Under such conditions the homogeneous gas phase reactions are eliminated and carbon nanotubes grow exclusively on the surface of the substrate by a heterogeneous surface reaction.

Figure 1:
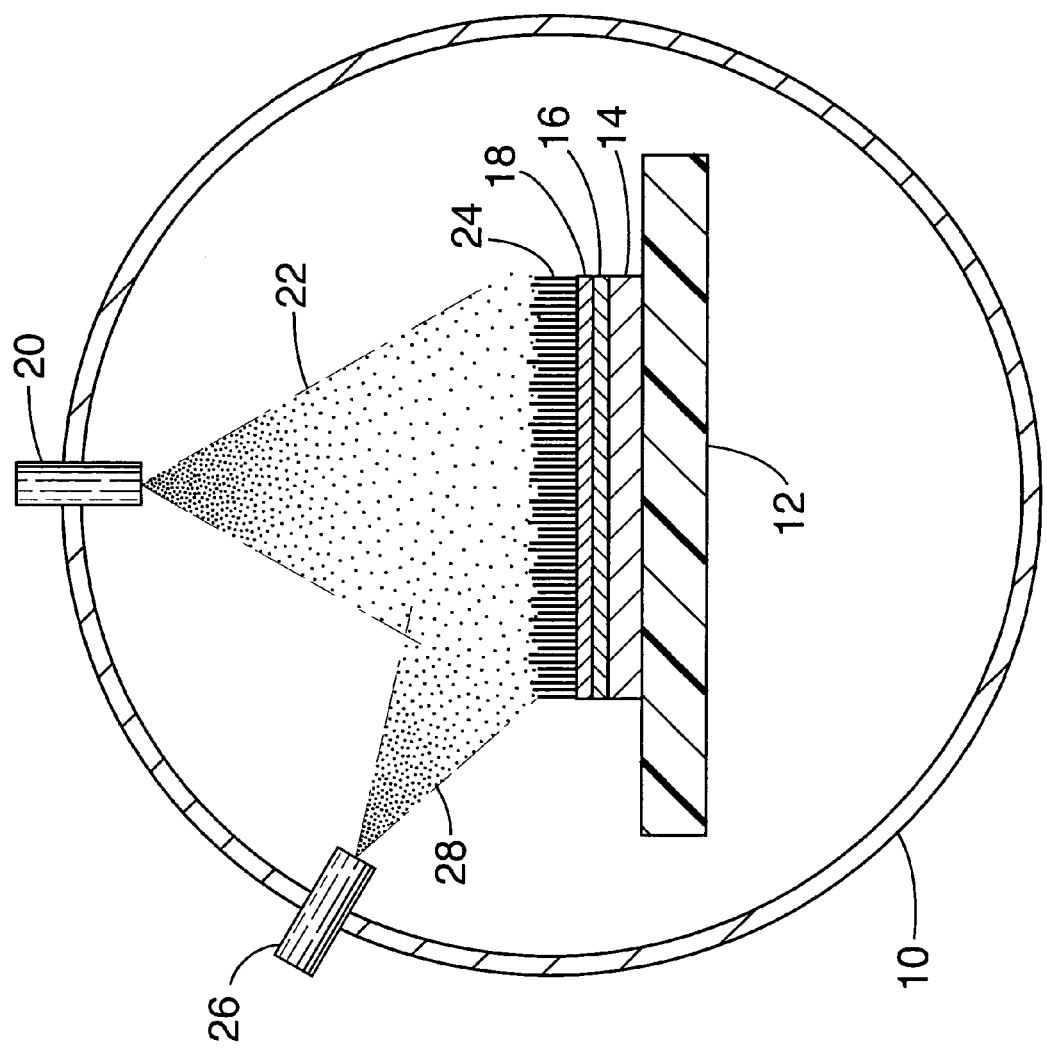
FIG. 1 is a simplified, schematic illustration of an apparatus for carrying out the present invention.

Referring to FIG. 1, which is not-to-scale, experiments to test the present invention were carried out in a vacuum chamber 10. A substrate 14 is heated by a heater 12. The substrate 14 includes thin layers of Al 16 and Fe 18. A molecular jet nozzle 20 emits a molecular beam 22 of a C-containing feed gas mixture toward the substrate 14 to form carbon nanostructures 24 thereon. An auxiliary molecular jet nozzle 26 emits a molecular beam 28 of $O_2$ or $H_2O$, or both toward the substrate 14.

Figure 2B:
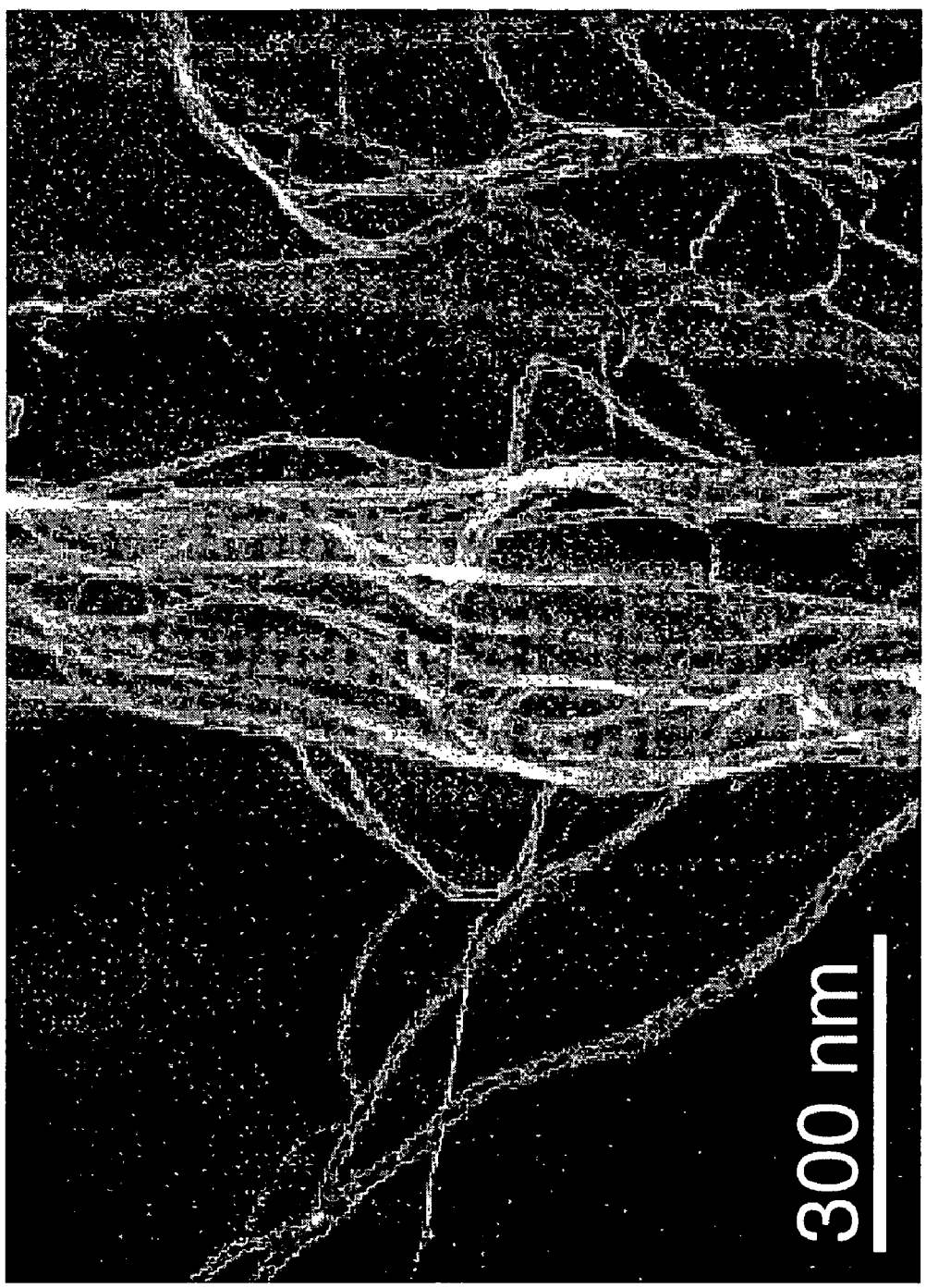
FIG. 2b is a high resolution SEM image of a dislodged bundle with individual SWCNT bundle diameters on the order of 10 nm in accordance with the present invention.

Upon collision with the surface of the substrate 14, C-containing molecules either chemisorb on the substrate 14, or bounce off and are pumped away. The number of C-containing molecules that undergo more than one collision with the substrate 14 is negligible because the sample area is very small relative to the surface area of the chamber 10. Under these conditions, CNT growth occurs only by heterogeneous reactions from primary precursors and their direct fragments. Secondary gas phase reactions do not contribute to CNT growth because all reaction products are scattered from the substrate 14 and are rapidly pumped away. The cross-sectional SEM image of a CNT film in FIG. 2*a* clearly reveals the outline of the incident beam profile and confirms that CNT growth occurs by a heterogeneous reaction induced by the incident source-gas beam. The curvature in the film surface is produced by the acetylene distribution in the molecular jet. FIG. 2*b* is a high resolution SEM image of a dislodged bundle with individual SWCNT bundle diameters on the order of 10 nm.

In the molecular beam environment the growth variables are independent of each other and used to control and optimize the characteristics of the CNTs. Such advance control capabilities reduce the growth temperature from above 900° C. for typical CVD to above 600° C. for molecular jet growth in accordance with the present invention. The low temperature growth and the absence of homogenous gas phase reactions combine to produce cleaner material that is free of undesirable byproducts significantly reducing the need for post growth processing and purification.

The growth of vertically aligned single wall carbon nanotube (VA-SWCNT) arrays is a particular advantage of the present invention. Vertical alignment in an array of CNTs generally occurs because the CNTs crowd each other as they grow. For crowding to occur a large number of CNTs must nucleate and grow simultaneously. Controlling the nucleation density is key to VA-SWCNT growth.

The ability of molecular jets to deliver a high flux (in terms of molecules per $cm^2$ per second) of source molecules enables high density nucleation that is necessary for VA-SWCNT growth. Moreover, the molecular jets also allow external control of nucleation and growth variables which are required to obtain optimal growth conditions for achieving vertical alignment. In contrast, these variables are not available in the CVD environment to control the outcome of the growth process.

The present invention generally concerns vertically aligned single wall carbon nanotube growth in a form of a thin film on a substrate. The focus of the present invention is on the method for the delivery of the source gas to the substrate. Gas delivery in a form of a molecular beam has numerous advantages over bulk gas flow which translate into better control over the growth process.

CNTs are generally grown on a substrate, and most substrates comprise commercially available Si wafers. In tests of the present invention, for example, 10×10 $mm^2$ Si wafers were used. Other materials can be used; however, it is prudent to optimize growth conditions through testing.

Typical Si substrates are coated with a catalyst, usually a multilayer metal film. The catalyst layer sequencing and the composition of the layers is known to be important for accomplishing vertical alignment. Key constituents of one type of catalyst layer are Al and Fe. The chemically active catalyst is Fe, and the thickness of the Fe layer must be controlled precisely. Al does not play a chemically active role in the process, but the thickness of the Al layer is also important for vertically aligned single wall carbon nanotube growth to work.

It is widely believed that the onset of CNT growth occurs after the formation of elemental Fe nanoparticles by reduction of iron oxide. However, the use of the Al—Fe catalyst system with molecular jet CNT growth revealed several trends that lead to a conclusion that the active sites are related to iron oxide, rather than elemental Fe. From the behavior of different chemical forms of iron in molecular jet growth studies, it further appears that SWCNT growth is more sensitive to the composition and the phase of the iron oxide ($Fe_3O_4$ or $\alpha$-$Fe_2O_3$) than the particle size. See catalyst studies hereinbelow.

The kinetic factors that affect VA-SWCNT growth can evolve spontaneously during growth, or they can be induced to change by external manipulation of the growth conditions. Subtle changes of the kinetic factors during growth affect thickness-dependent properties of the films, such as their alignment, density and CNT type.

Figure 3:
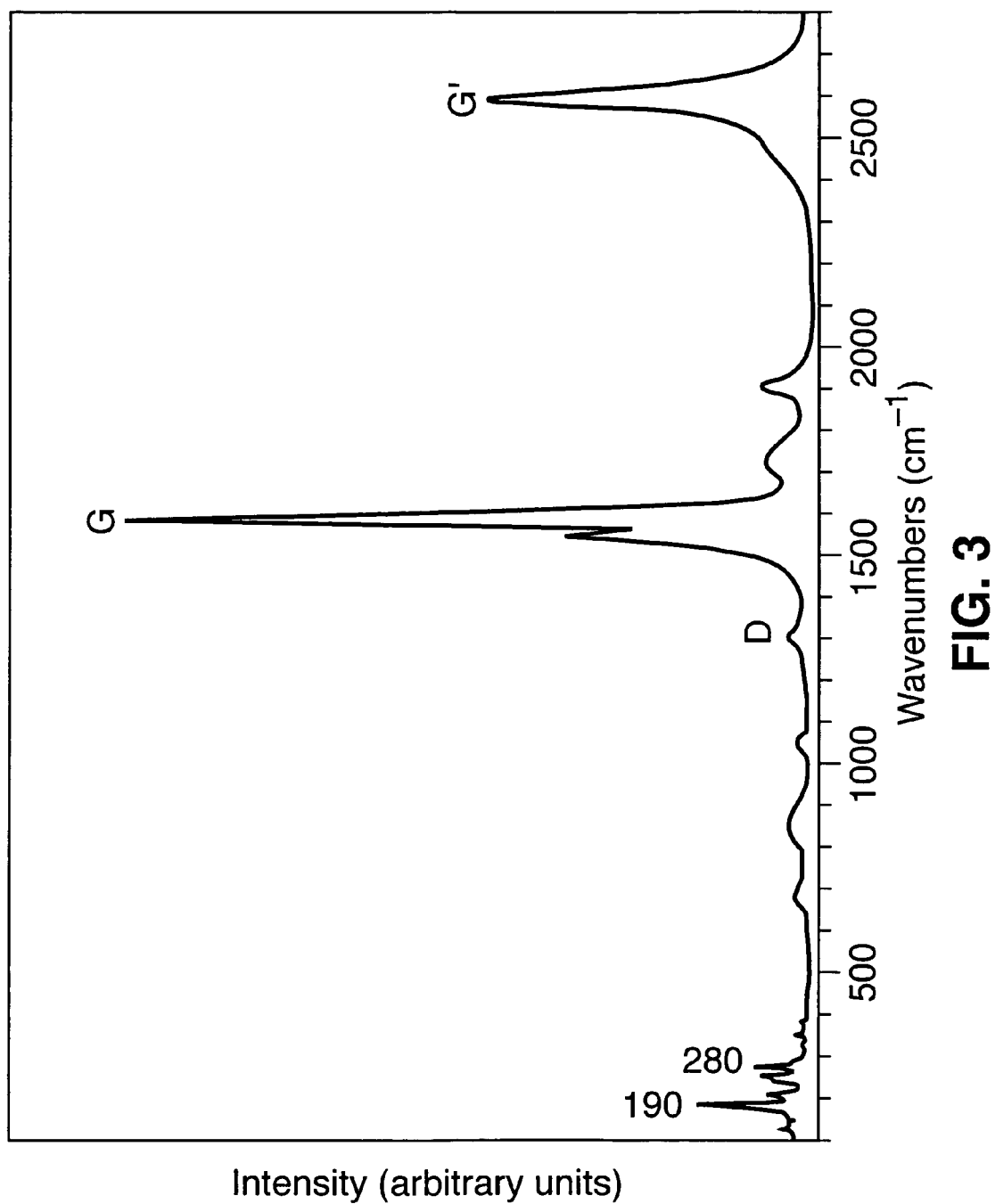
FIG. 3 shows a typical Raman spectrum of a VA-SWCNT film taken at 633 nm laser wavelength. The main features of interest are the G- and the D-bands and the RBMs at 190 and 280 $cm^{-1}$.
Figure 4A:
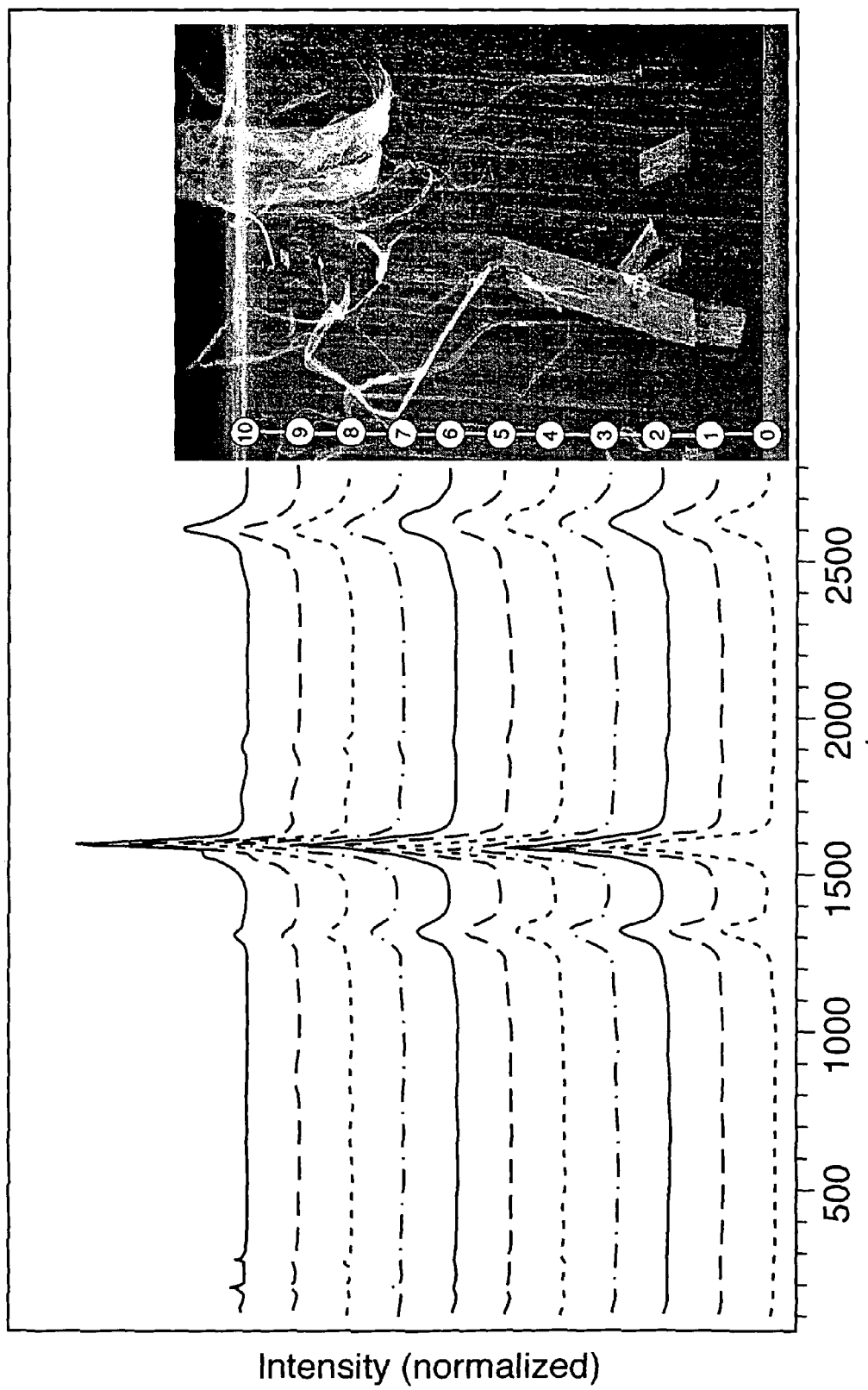
FIG. 4a shows a series of spatially-resolved Raman spectra as a function of VA-CNT film thickness.
Figure 4B:
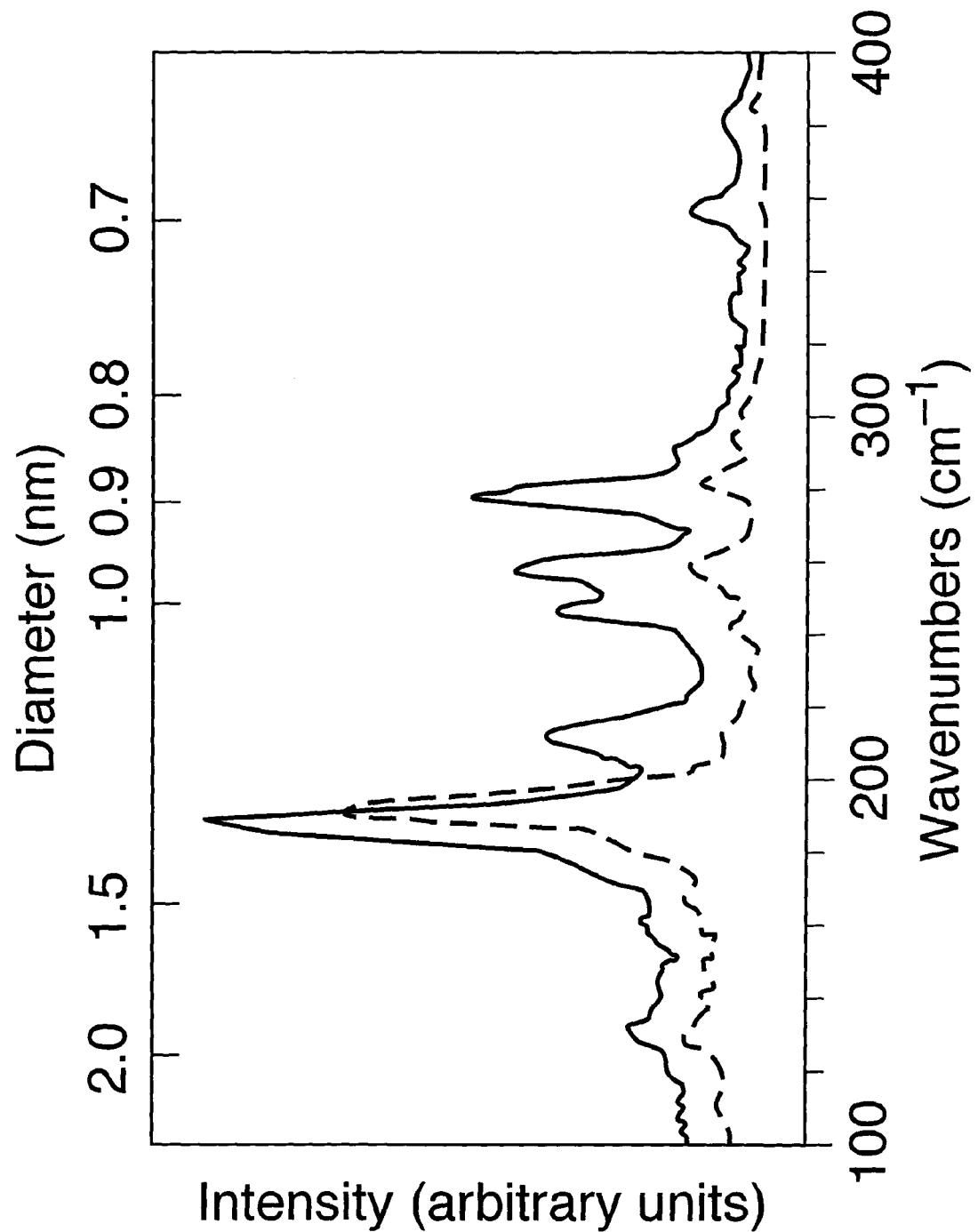
FIG. 4b compares the enlarged RBM region of the spectra collected from the top of a thin (dashed line) and thick film (solid line).
Figure 4C:
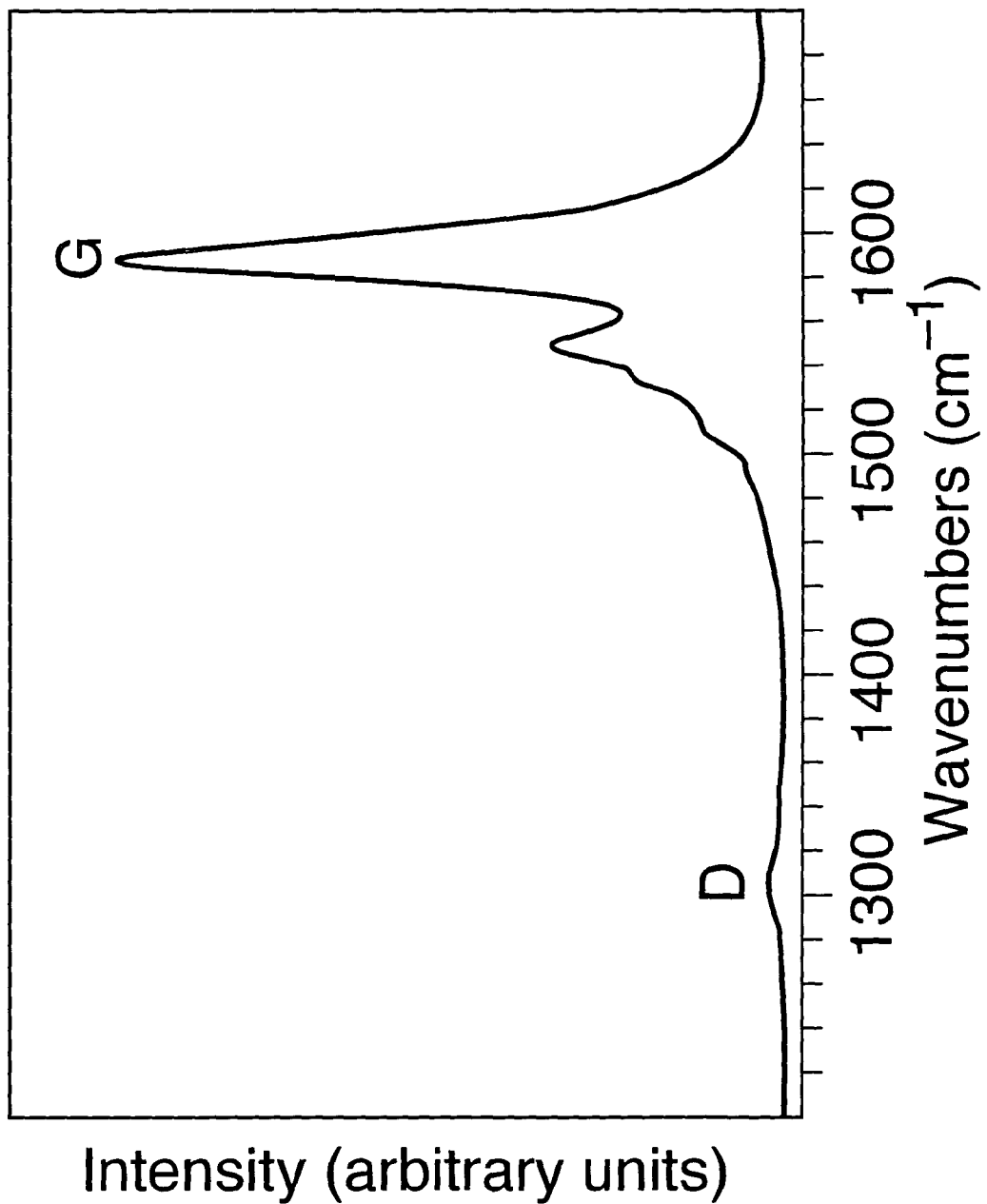

FIG. 3 illustrates the main features of interest in a typical Raman spectrum of vertically aligned SWCNT films. FIG. 4*a* shows a series of spatially-resolved Raman spectra as a function of VA-CNT film thickness. The SEM image on the right shows a 100 µm thick film. The numbers on the SEM image correspond to 10 µm steps at which the Raman spectra were collected, 0 being at the substrate surface. FIG. 4*b* shows the enlarged radial breathing mode (RBM) region of spectra collected from the top of the film in which the dashed line is for a thin film, and the solid line is for a thick film. The CNT diameters were calculated from d=248/$\omega_{RBM}$. The RBM peaks of interest are the 190 and 280 cm$^{-1}$ peak. FIG. 4c shows the enlarged D and G band region. The G to D Raman peak ratio ($I_G/I_D$) reveals the degree of graphitic ordering, and is often used as a figure of merit for evaluating and comparing the quality of CNTs from different experiments.

Figure 5B:
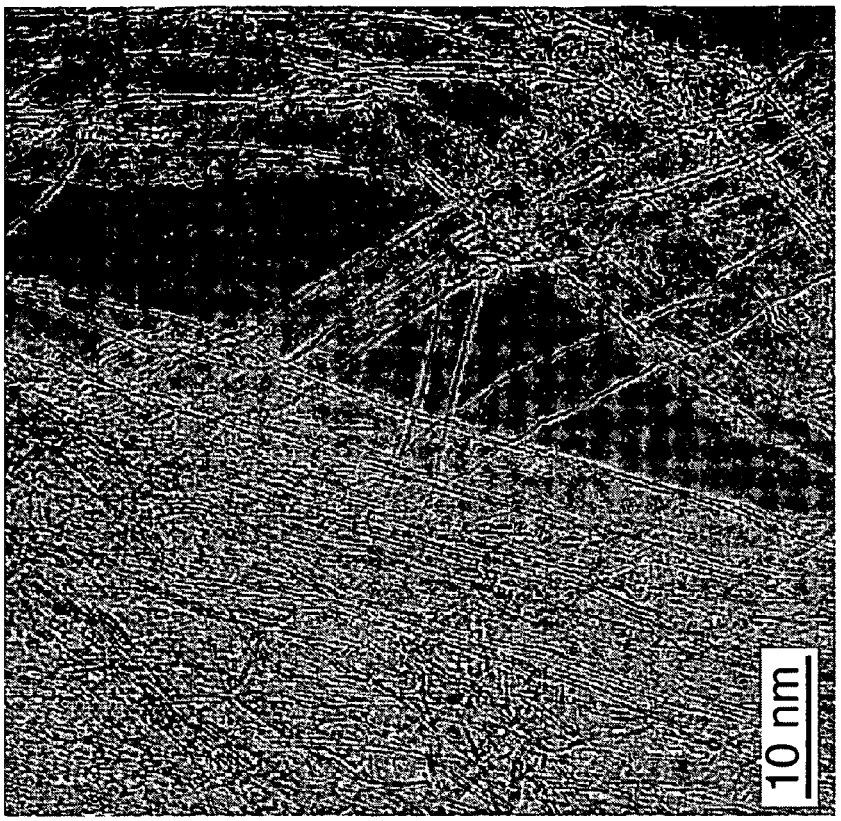
FIG. 5b is a TEM image of a 160 µm thick film showing both SWCNTs and DWCNTs.
Figure 5A:
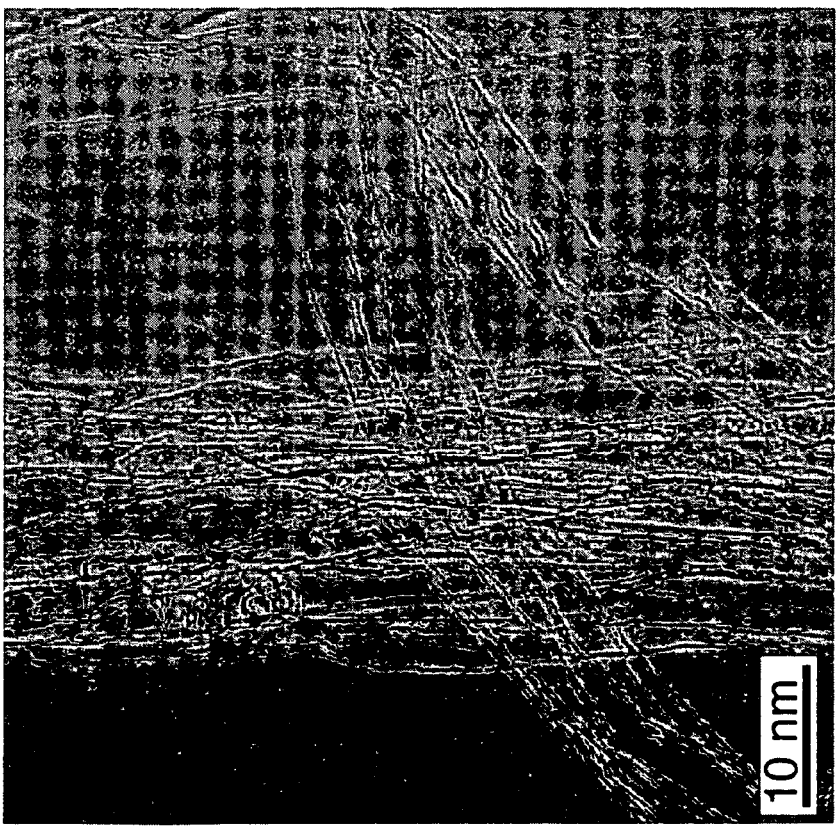
FIG. 5a is a TEM image of a 50 µm thick film showing SWCNTs.

The spatially-resolved Raman spectra in FIG. 4a, exhibit a clearly resolved shoulder on the G-band (see FIG. 4c) and strong intensity in the RBM (see FIG. 4b). Both features are a signature of high quality SWCNTs. The RBM peaks around 280 cm$^{-1}$ correspond to small diameter (<0.9 nm) CNTs that could be individual SWCNTs, or these features could be attributed to inner tubes in DWCNTs. Similar plots collected for different overall growth times (and thicknesses) presented in FIGS. 7a, 7b reveal that the CNTs nucleate and initially grow as SWCNTs. In addition to the Raman data, TEM images show that films grown for up to 20 min (about 50 μm) depicted in FIG. 5a consist of SWCNTs. It was noted that the catalyst remains at the substrate, i.e. the CNTs grow "from the base," as shown in FIG. 8a and discussed hereinbelow.

The feedstock which provides C for the growth of carbon nanotubes generally comprises C containing molecules. A variety of different C containing molecules were tested; acetylene proved far superior to any other C containing molecule for vertically aligned single wall carbon nanotube growth. The reason for this is that acetylene directly incorporates into the CNT network with no need for formation of intermediate compounds. This means that acetylene type of molecular species must be the main intermediates that lead to carbon nanotube growth with hydrocarbons such as methane, ethylene, and other small hydrocarbons. The other hydrocarbons are poor growth gases because the actual growth species must form first in secondary reactions, some of which are dependent on yet other intermediates which makes the process less efficient. The discovery that acetylene is the principal precursor to carbon nanotube growth is directly related to the fact that secondary gas phase reactions are eliminated in the molecular jet environment. Under these conditions, only molecular species that are directly incorporated into the carbon nanotube contribute to the growth. See source gas studies hereinbelow.

The present invention therefore preferably involves the use of acetylene as a C feedstock in the form of a molecular beam that is also referred to as a molecular jet. One way to explain the reason for this dual nomenclature is by noting that some artisans consider molecular jets to be sources from which molecular beams are obtained. Moreover, at the nozzle-to-substrate distances used in carrying out the present invention, the gas jet collides with the substrate near the free molecular flow regime. The terms are used interchangeably herein; no particular distinction is made. The molecular jet is generated by a high pressure gas-expansion through a small nozzle orifice into a high vacuum background. The characteristics of the molecular jet depend both on the pressure behind the nozzle orifice, referred to as the stagnation pressure, and the background vacuum in the chamber. The molecular jet is a highly directional source for delivering the acetylene molecules to the heated substrate.

The acetylene molecules are mixed with other gases collectively referred to as the carrier gas. The feed gas mixture usually comprises 2% acetylene, 10% hydrogen and 88% helium. This preferred gas mixture was found to be optimal for vertically aligned single wall carbon nanotube growth. The stagnation pressures used were in the range from a few psig to 100 psig. The typical pressure in the vacuum chamber during film growth is 10$^{-4}$ Torr. The nozzle orifice diameter was 100 μm, but larger sizes can be used if adequate pumping capacity is available.

When the molecular jet collides with the heated substrate CNT growth occurs. Vertically aligned growth occurs only above a certain threshold flux of 2×10$^{18}$ molecules per cm$^2$ per second. Below this threshold single wall carbon nanotubes grow in a form of a random mat, similar to CVD carbon nanotube growth. Above the threshold the carbon nanotube growth rate is proportional to the flux. The characteristics of the carbon nanotubes can be changed by changing the beam flux. The beam flux can be changed by changing the nozzle-to-substrate distance at fixed stagnation pressure, or by changing the stagnation pressure at fixed nozzle-to-substrate distance. The nozzle-to-substrate distance was held in a range between 5 mm and 15 mm. The carbon nanotube diameter decreases with increasing flux at fixed substrate temperature. The substrate temperature can be varied independently and combined with the beam flux can be used to control the characteristics of the growing carbon nanotubes.

Figure 6A:
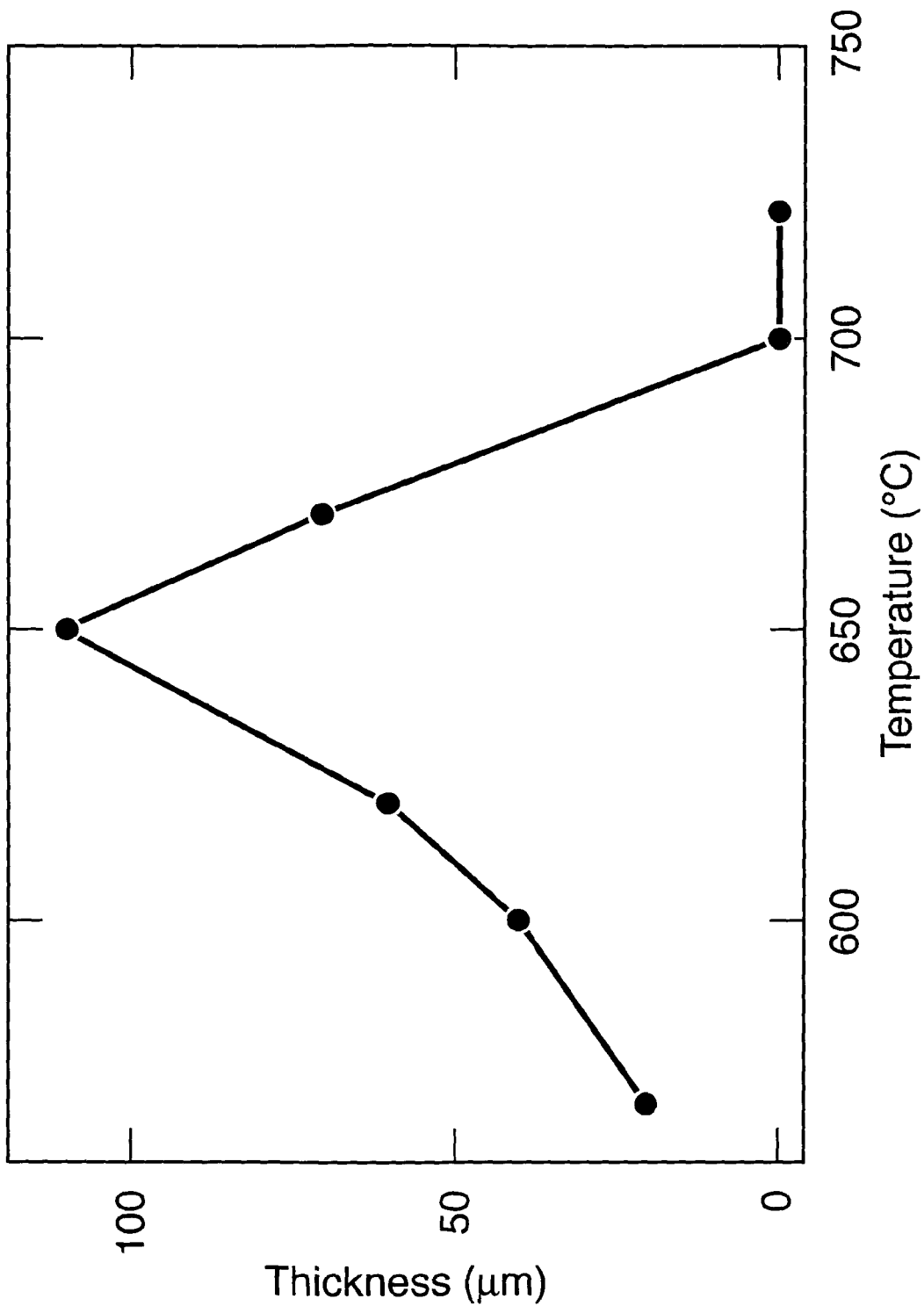
FIG. 6a is a graph showing film thickness as a function of substrate temperature for a fixed incidence rate of $3 \times 10^{18}$ molecules/$cm^2$s.
Figure 6B:
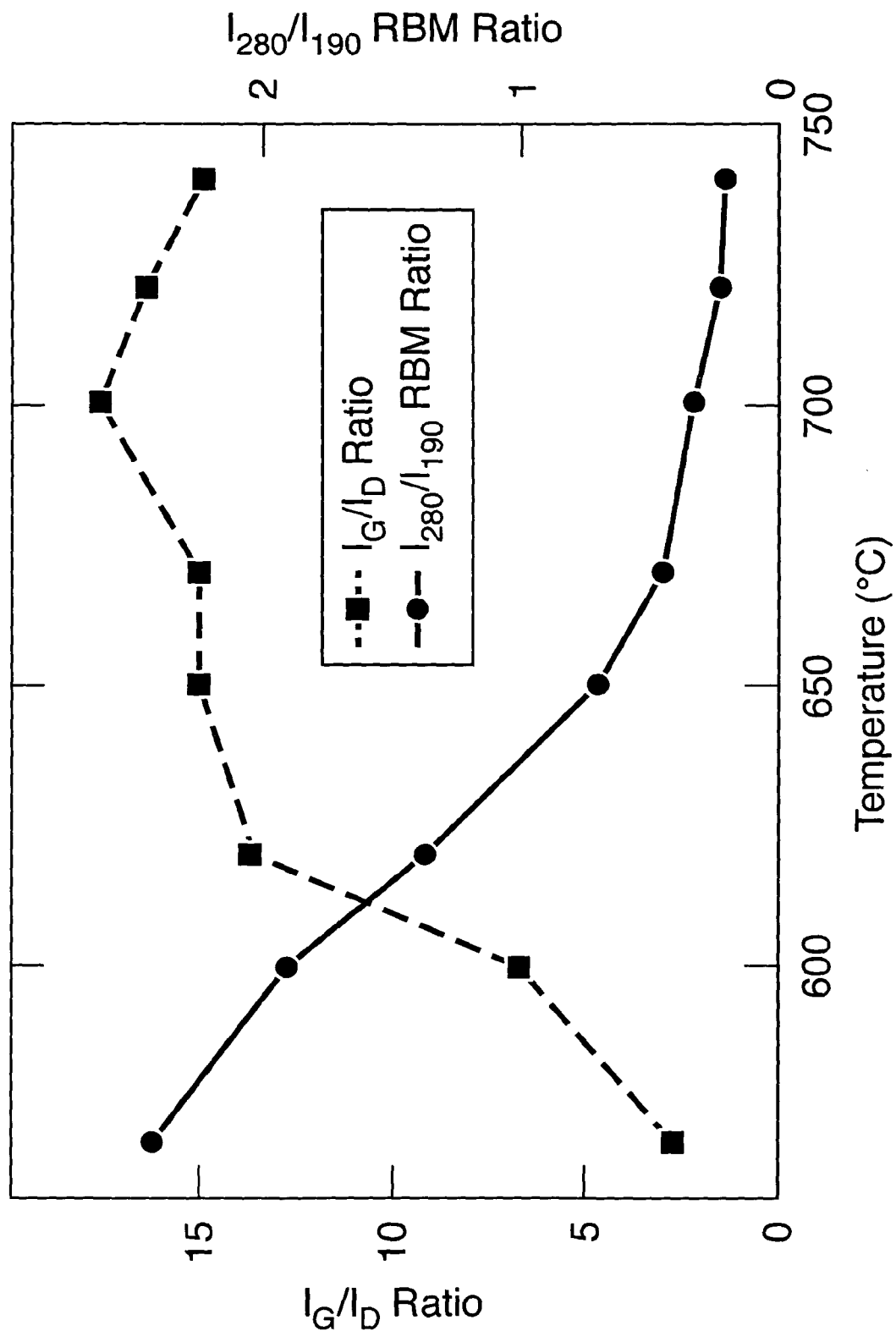
FIG. 6b is a graph showing $I_G/I_D$ ratio and the $I_{280}/I_{190}$ RBM ratio as a function of substrate temperature.
Figure 6C:
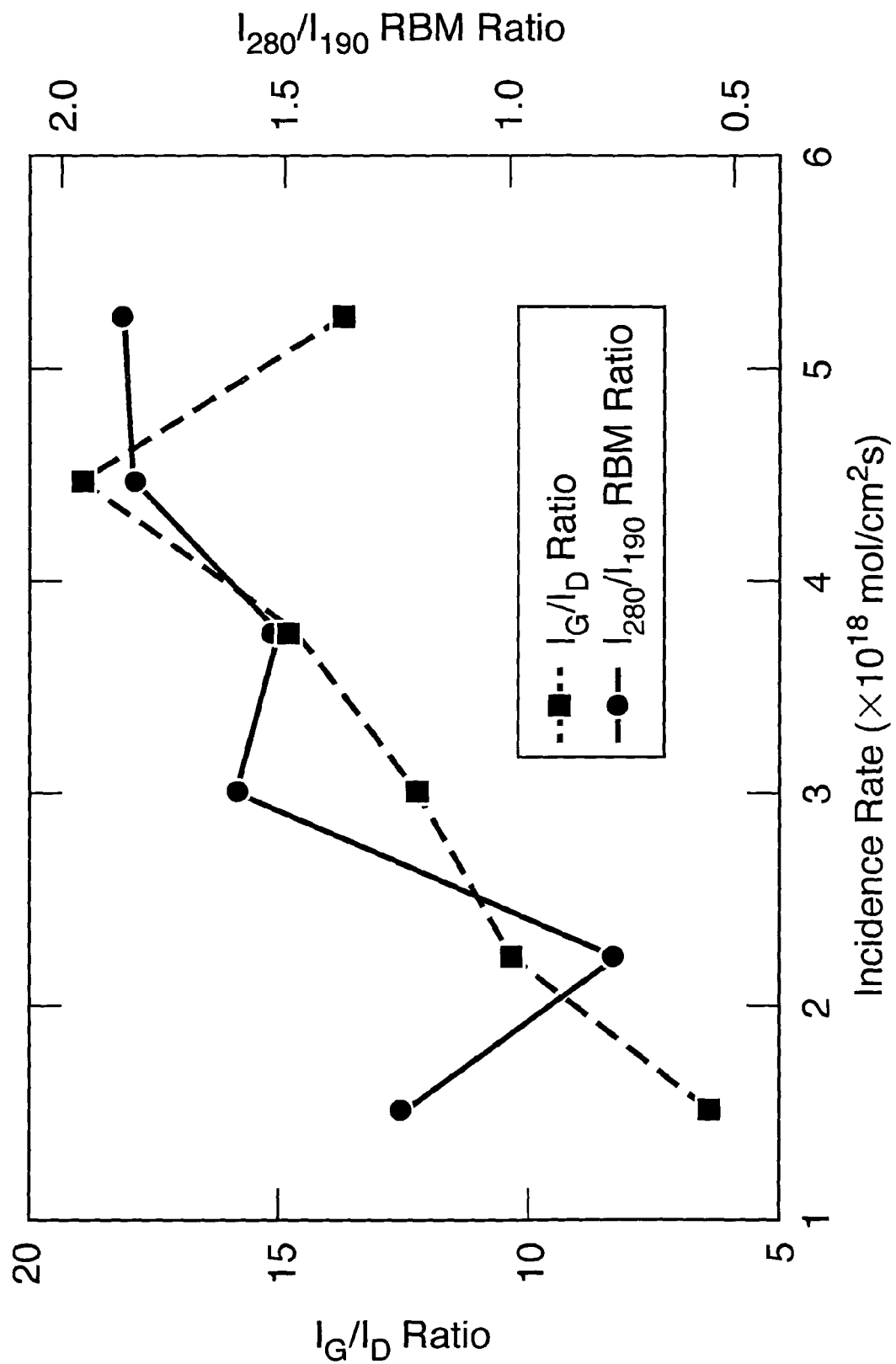
FIG. 6c is a graph showing $I_G/I_D$ ratio and the $I_{280}/I_{190}$ RBM ratio as a function of incidence rate.
Figure 6D:
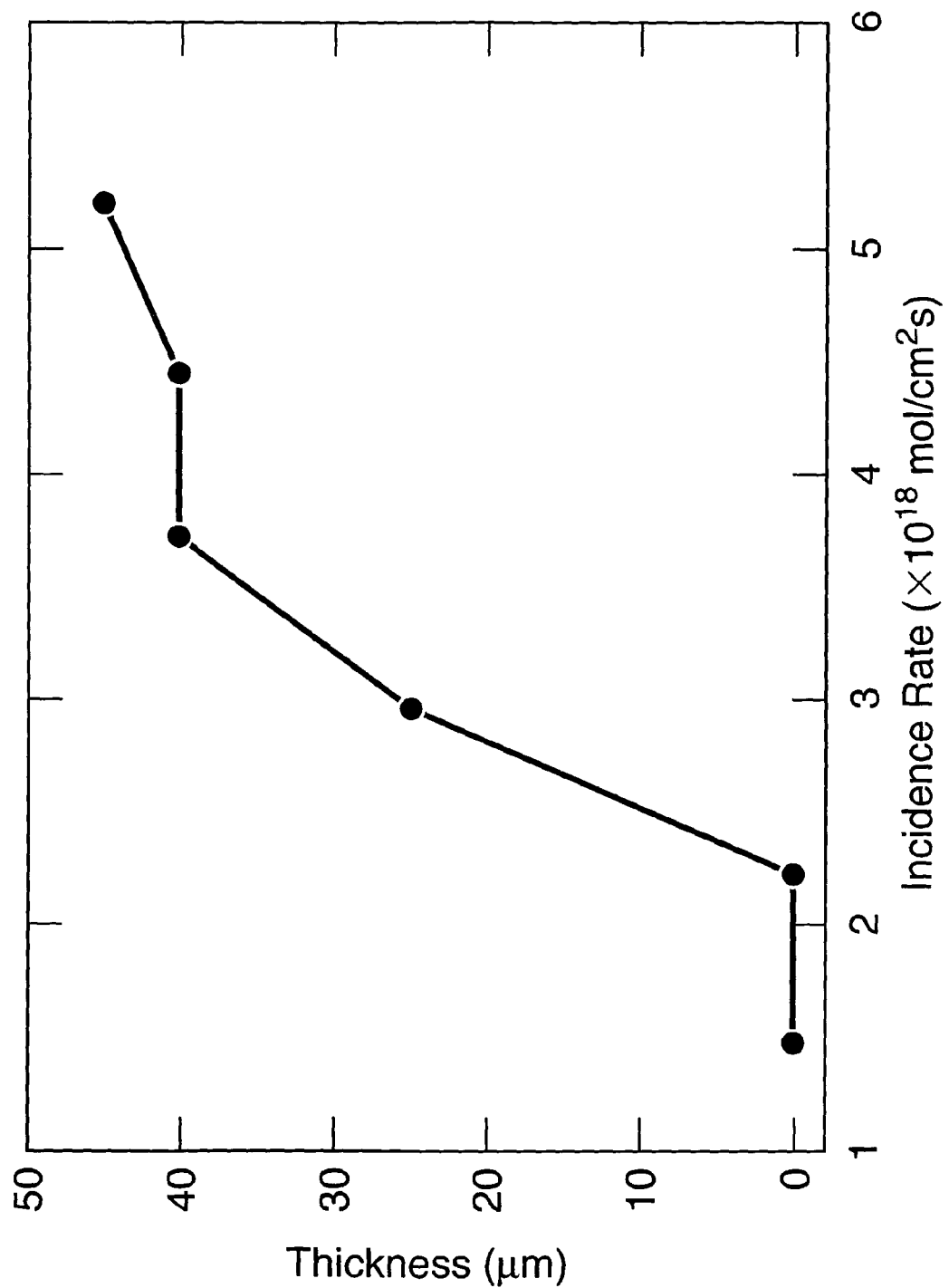
FIG. 6d is a graph showing film thickness as a function of incidence rate.

The versatility of the molecular beam method of the present invention allows direct, systematic investigation of the effects of external growth variables such as the substrate temperature and the feedstock molecules incidence rate on the characteristics of the CNT films. The knowledge derived from such studies can be used to optimize the growth conditions and diminish or counteract the effects of spontaneous kinetic factor changes. The temperature dependent measurements in FIG. 6a show that VA-SWCNT growth occurs in a narrow substrate temperature window in the range from 570° C. to 700° C., with the maximum growth rate at 650° C. Interestingly, high quality CNT growth persists past 700° C. where aligned growth ceases, as the unchanged $I_G/I_D$ ratio in FIG. 6b shows. The decreasing $I_{280}/I_{190}$ RBM ratio in FIG. 6b indicates that the relative fraction of larger diameter CNTs increases with the substrate temperature at a fixed incidence rate. The most dramatic effect associated with the incidence rate is a transition from SWCNT growth in a form of random mats to vertically aligned growth that occurs at an incidence rate of 2×10$^{18}$ acetylene molecules/cm$^2$s (see FIGS. 10a, 10b). FIG. 6d shows that above 2×10$^{18}$ acetylene molecules/cm$^2$s the film thickness increases with the incidence rate. The increase in the $I_{280}/I_{190}$ RBM ratio depicted in FIG. 6c indicates that the relative fraction of small diameter CNTs increases with the incidence rate. Note that this decrease of the CNT diameter occurs at constant nanoparticle size conditions dictated by the fixed substrate temperature.

Figure 7A:
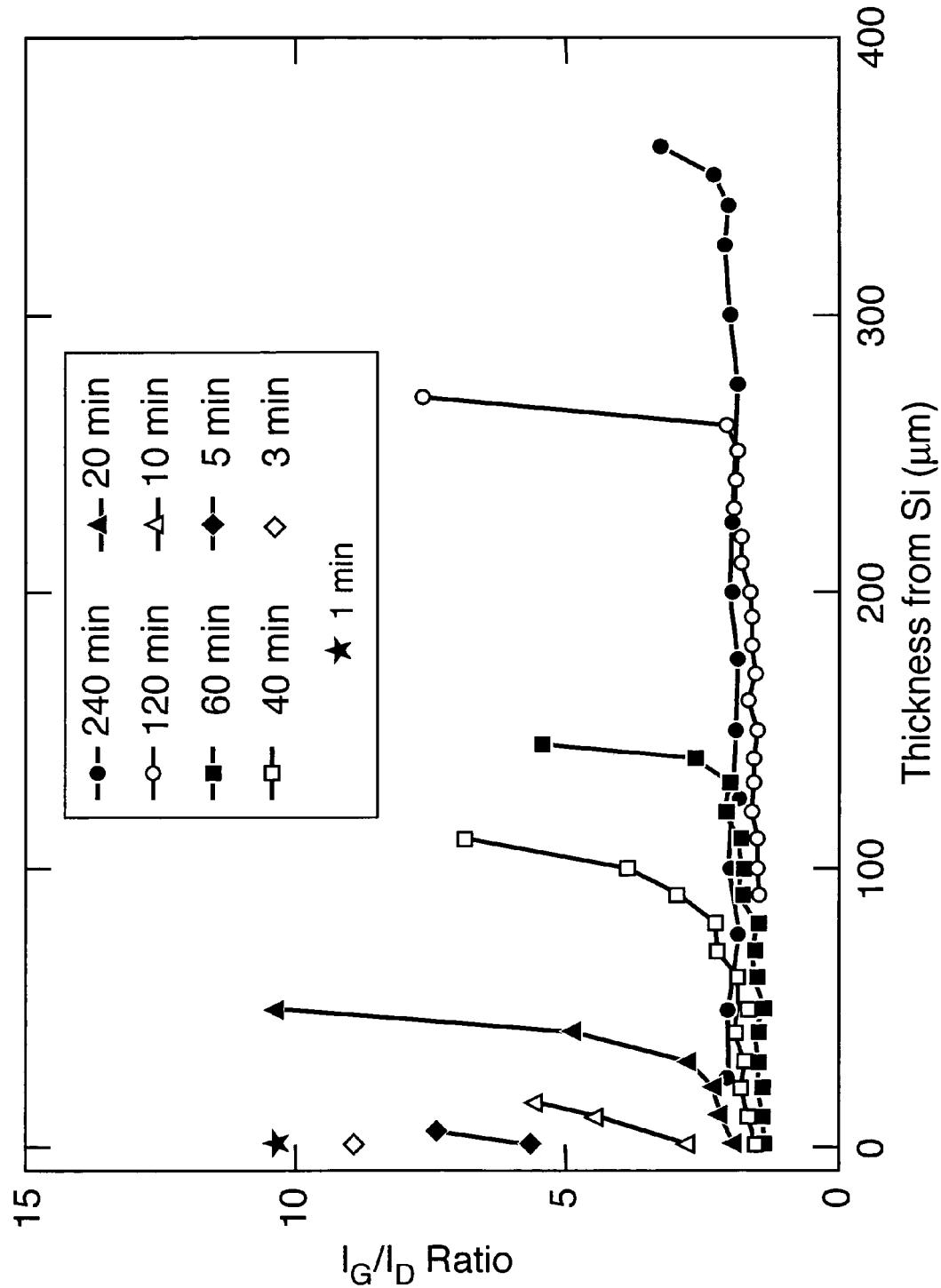
FIG. 7a is a graph showing $I_G/I_D$ ratio as a function of thickness from Si for films grown at a series of growth times at 650° C. and $3 \times 10^{18}$ molecules/$cm^2$s.
Figure 7B:
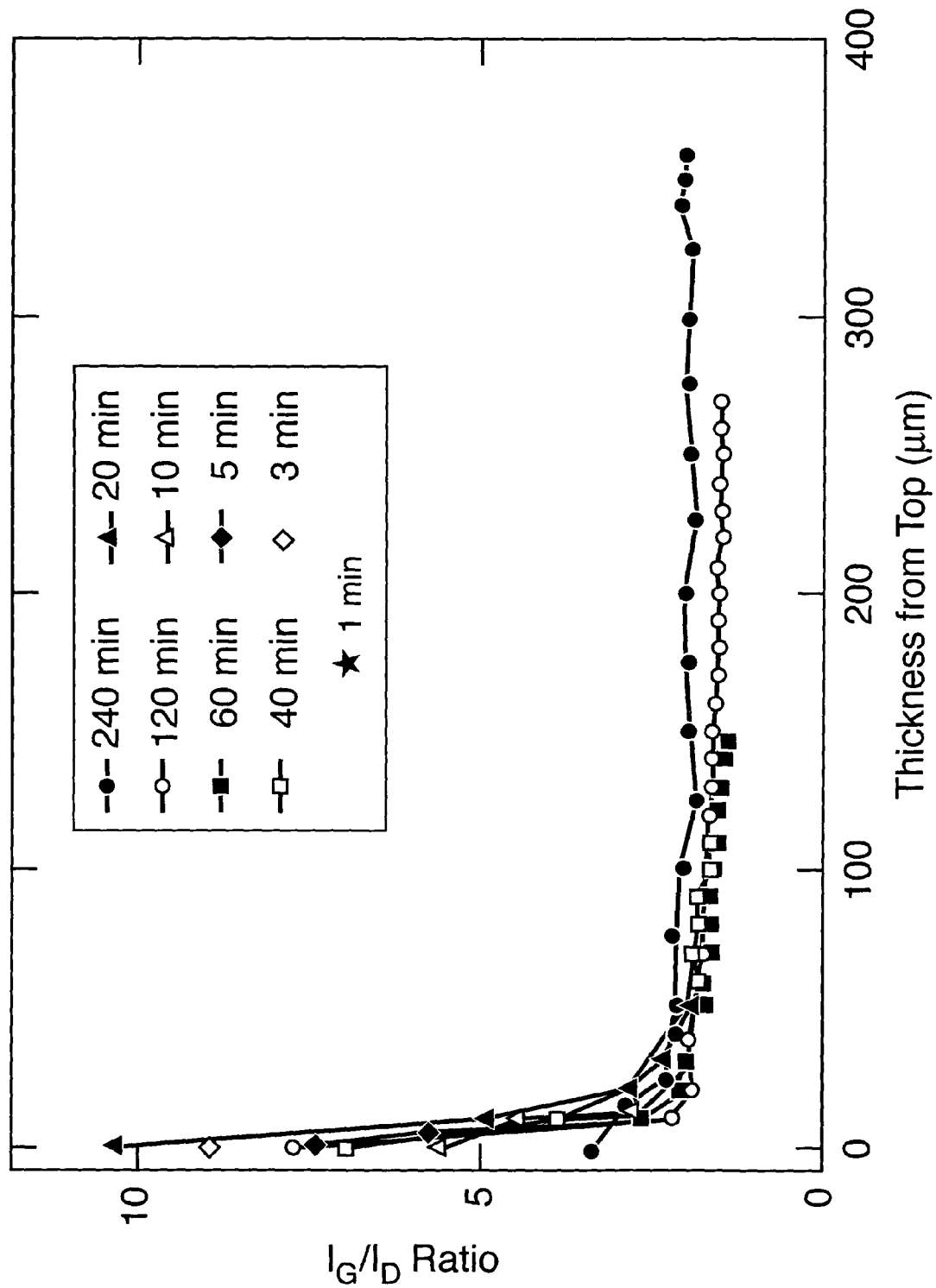
FIG. 7b is a graph showing $I_G/I_D$ ratio as a function of thickness from the top for films grown at a series of growth times at 650° C. and $3 \times 10^{18}$ molecules/$cm^2$s.
Figure 8A:
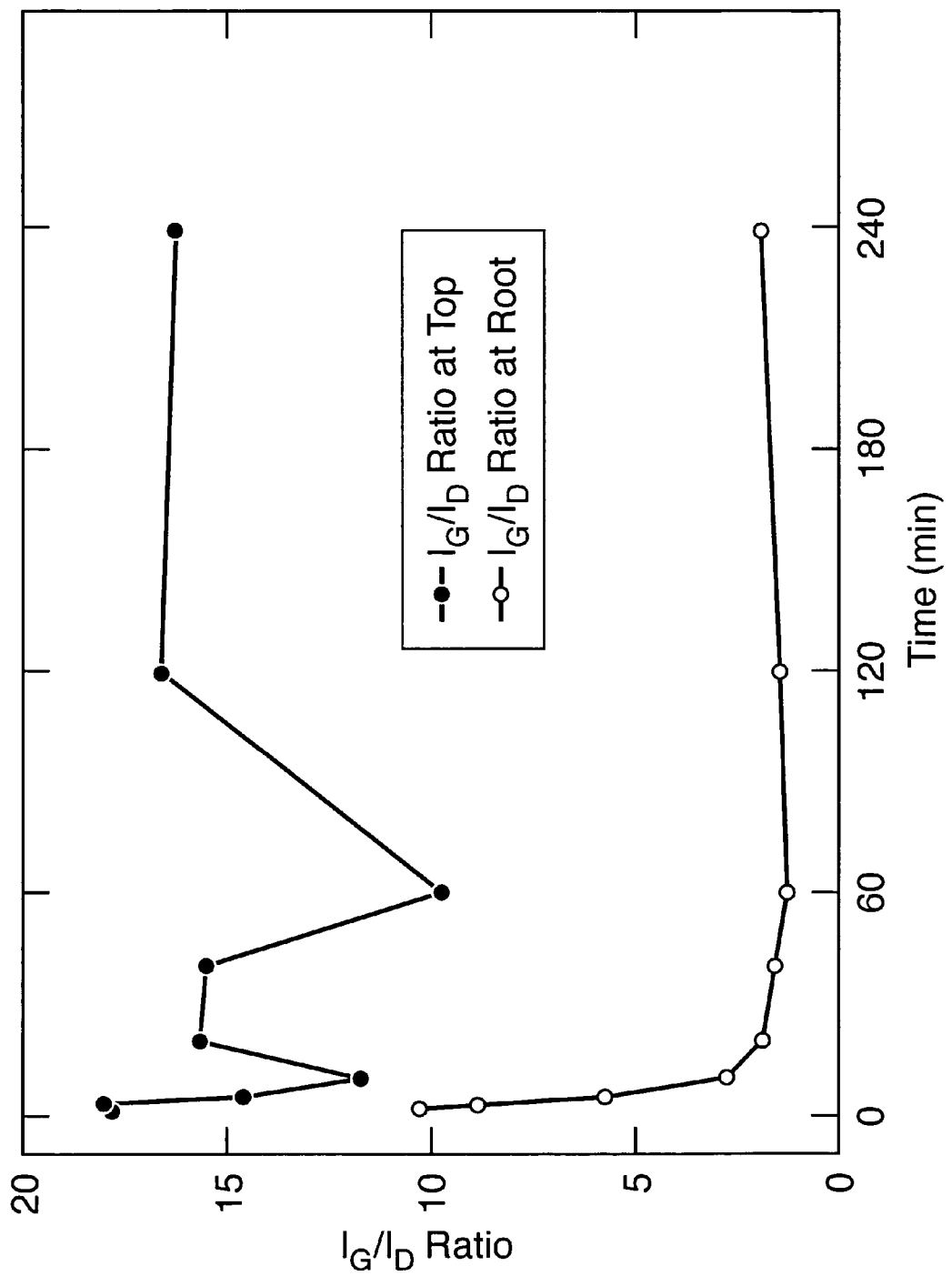
FIG. 8a is a graph showing $I_G/I_D$ ratio as a function of time for Raman spectra collected at the top and near the interface with the catalytic particles.
Figure 9A:
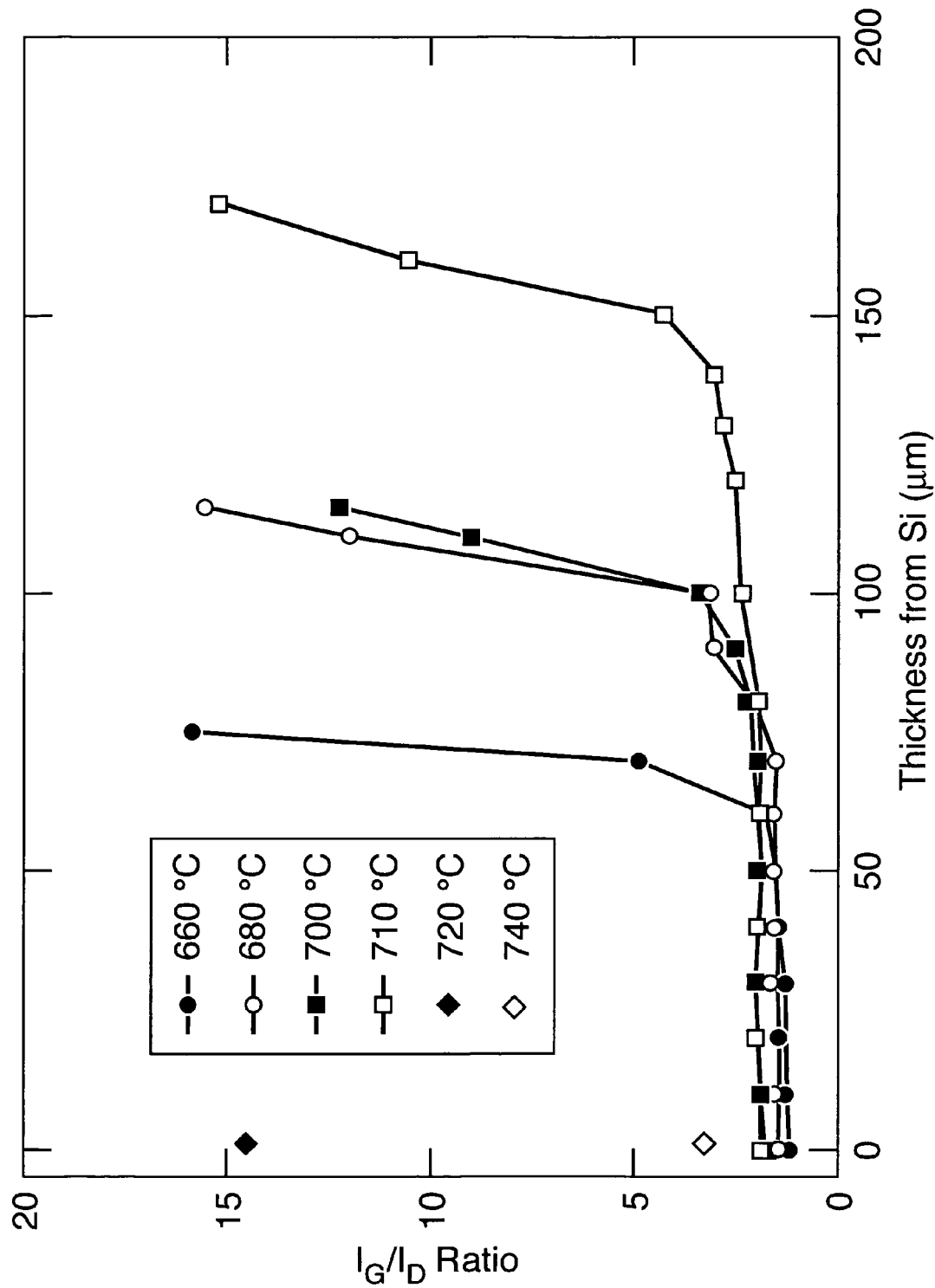
FIG. 9a is a graph showing $I_G/I_D$ ratio as a function of thickness from Si for films grown at a series of substrate temperatures and a fixed incidence rate of $6 \times 10^{18}$ molecules/$cm^2$s.
Figure 9B:
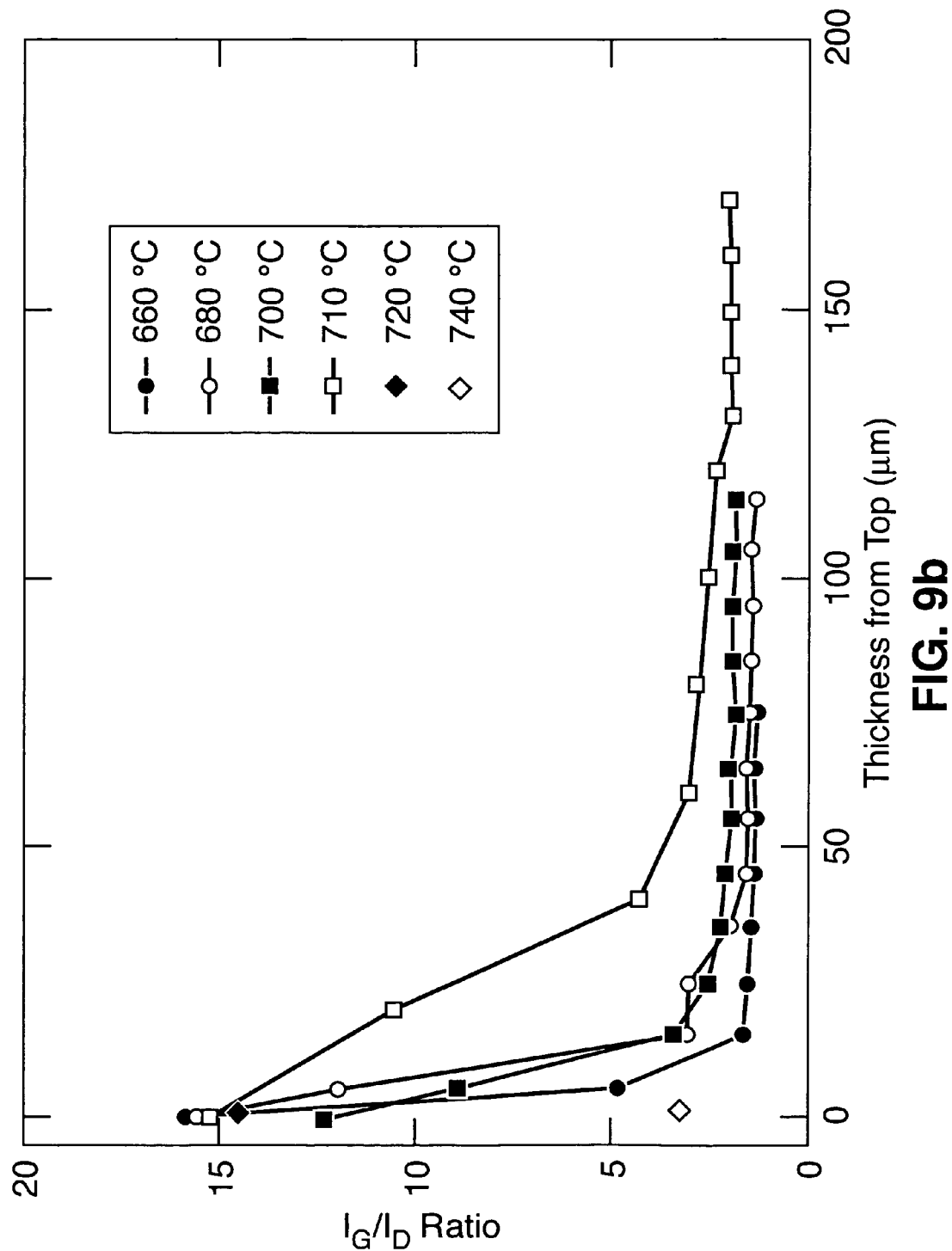
FIG. 9b is a graph showing $I_G/I_D$ ratio as a function of thickness from the top for films grown at a series of substrate temperatures and a fixed incidence rate of $6 \times 10^{18}$ molecules/$cm^2$s.
Figure 10A:
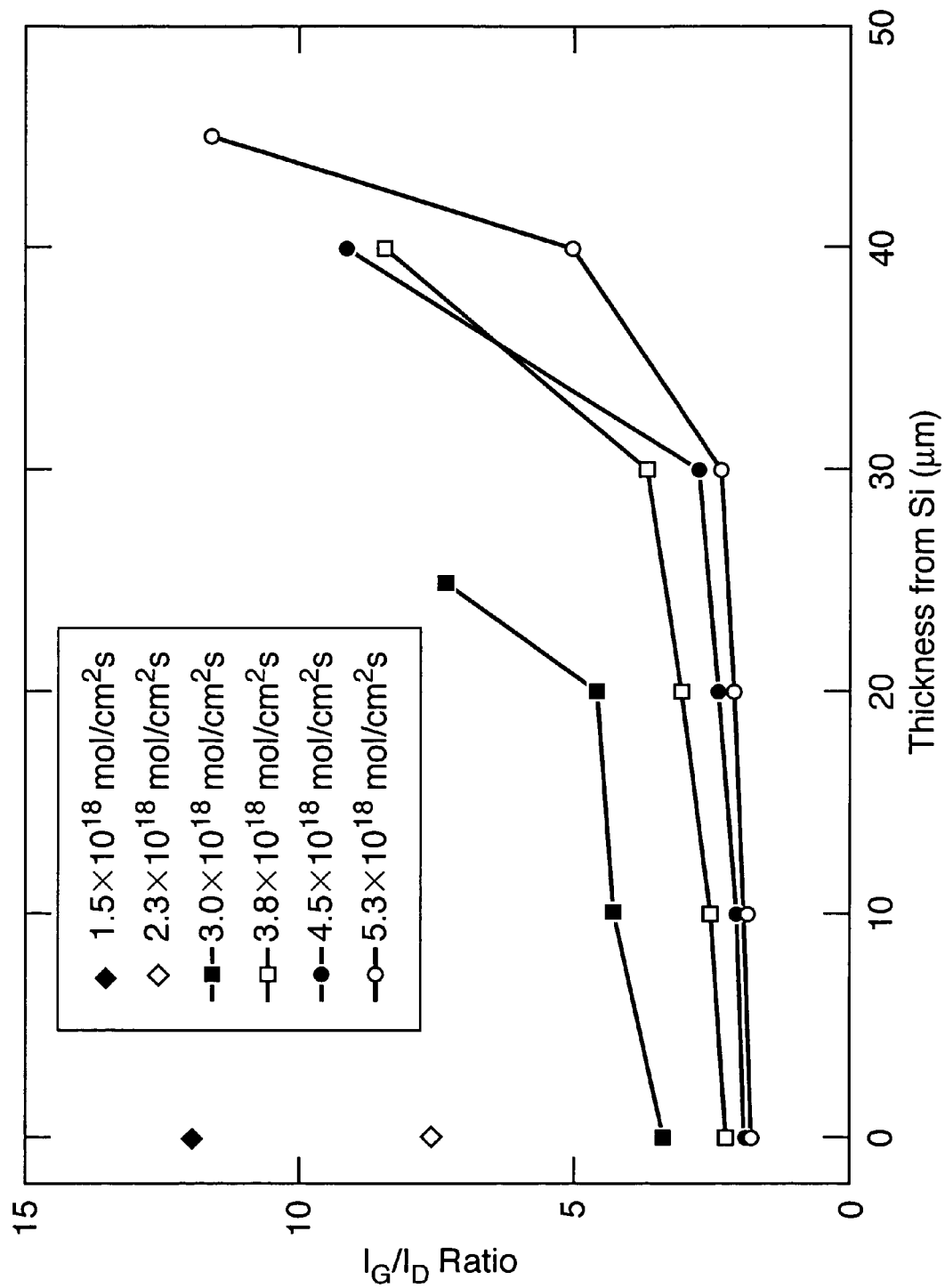
FIG. 10a is a graph showing $I_G/I_D$ ratio as a function of thickness from Si for films grown at a series of incidence rates and a fixed substrate temperature of 650° C.
Figure 10B:
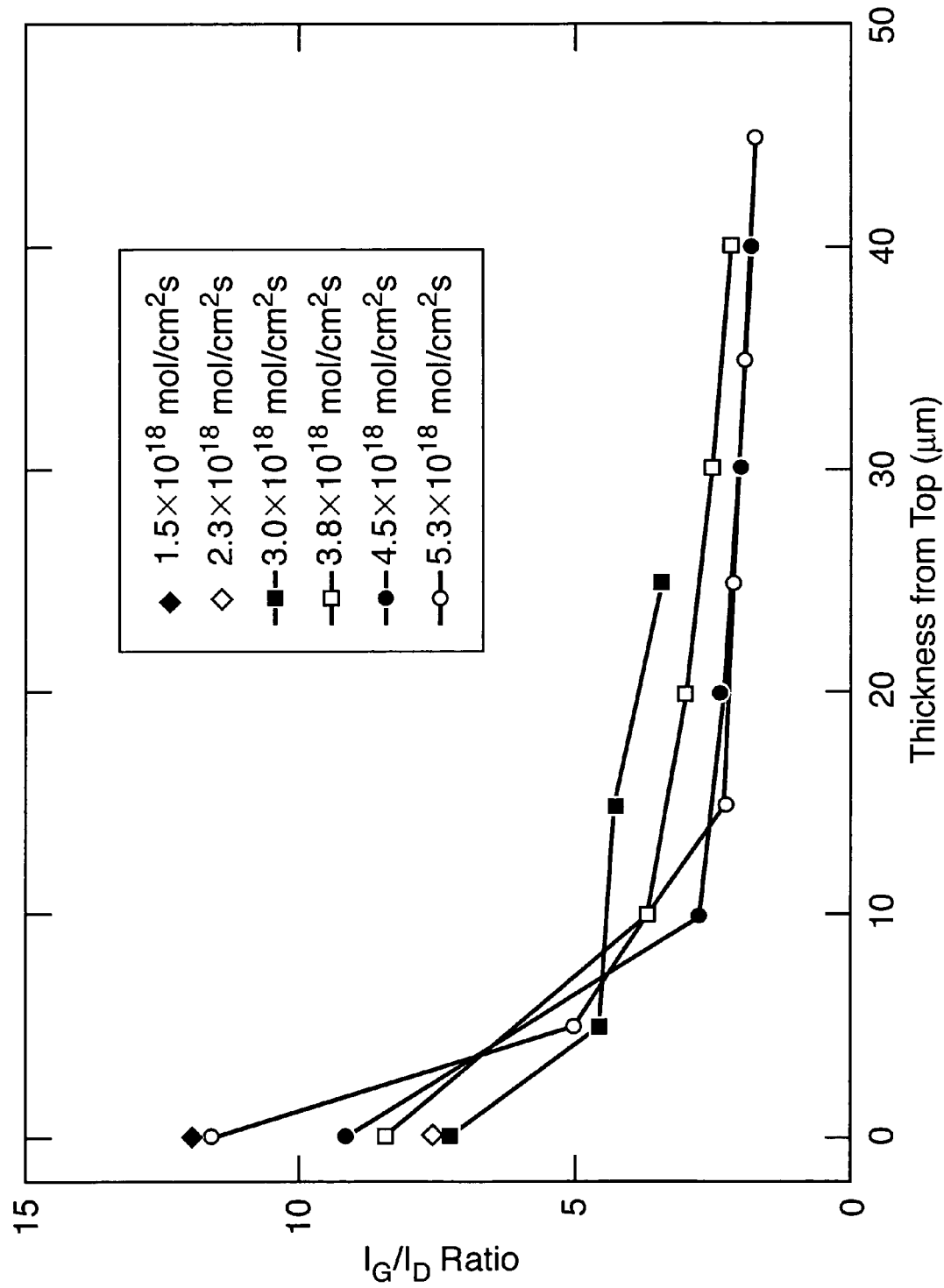
FIG. 10b is a graph showing $I_G/I_D$ ratio as a function of thickness from the top for films grown at a series of incidence rates and a fixed substrate temperature of 650° C.

FIGS. 7a and 7b are graphs showing $I_G/I_D$ ratio as a function of thickness from Si and from the top, respectively, for films grown at a series of growth times at 650° C. and 3×10$^{18}$ molecules/cm$^2$s. FIGS. 9a and 9b are graphs showing $I_G/I_D$ ratio as a function of thickness from Si and from the top, respectively, for films grown at a series of substrate temperatures and a fixed incidence rate of 6×10$^{18}$ molecules/cm$^2$s. FIGS. 10a and 10b are graphs showing $I_G/I_D$ ratio as a function of thickness from Si and from the top, respectively, for films grown at a series of incidence rates and a fixed substrate temperature of 650° C. The lines in FIGS. 7a, 7b, 9a, 9b, 10a, 10b are guides to the eye. Symbols only, represent non-vertically aligned SWCNT films. The thickness plot from the Si surface describes the properties of each particular film. The thickness plot from the top compares the thickness dependent changes as a function of the particular variable.

Results obtained in the development of the present invention evoke a paradigm that is at odds with the conventional dissolution/precipitation model and the conventional notion that the nanoparticle size dictates the CNT diameter. In the present invention, the growth mechanism appears to be based on stepwise addition of acetylene molecules, a process that is independent of the catalyst particle size. Acetylene is known to be the essential building block in the growth of other forms of carbon including soot and diamond, and the present invention adds CNTs to the list.

FIG. 11a illustrates a probable reaction pathway and intermediates in formation of a (5,5) CNT nucleus (cap). The impinging acetylene molecules are catalytically dehydrogenated by the iron oxide and remain attached to the surface. As more acetylene arrives, polyacetylene chains 63 and small ring structures 62 form by radical-type condensation reactions.

Flouranthene 64 forms by cyclization from a polyacetylene chain and a small ring structure. Further growth of the precursor occurs through extension of the aromatic edges to form corannulene 66. Subsequent addition of more acetylene molecules and isomerization thereof form a CNT cap 68 of interconnected pentagons and hexagons that is essentially equivalent to half a fullerene (buckyball) structure.

FIG. 11b illustrates a probable mechanism of CNT formation after the CNT cap 68 is formed. Growth occurs through a disordered, web-like network 70 that is attached to the edges of the cap 68. The CNT cap 68 is attached to the surface of the catalyst particle. An example of benzene ring closure after H atom migration is designated by 74, and an example of formation of a five-carbon ring by $H_2$ desorption is designated by 72. Other reaction and intermediate pathways are possible; this one is shown to assist in the practice of the present invention.

The above described mechanism of CNT nucleus formation is similar to the known model of fullerene formation from PAHs by stepwise addition of acetylene. In the invention, the CNT nucleus is attached to both the surface and to the disordered web-like material that supplies C at the base of the growing CNT. Carbon that is incorporated into the CNT is replenished by the impinging acetylene molecules.

Figure 8B:
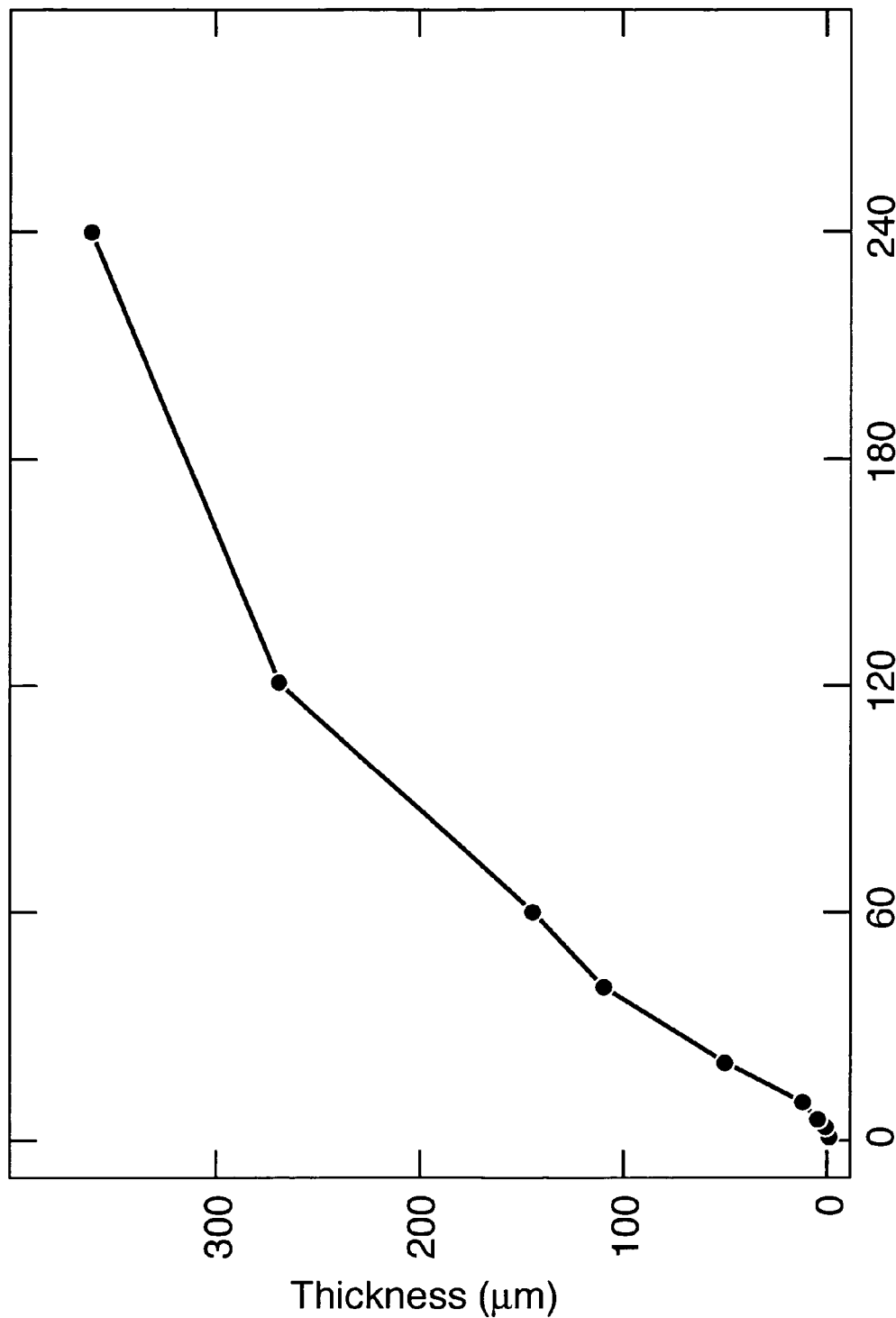
FIG. 8b is a graph showing a plot of the thickness as a function of growth time derived from data in FIGS. 7a, 7b.

One could argue that the nanoparticle size indirectly plays a role in this mechanism, because for a surface process the growth rate is expected to be proportional to the surface area of the nanoparticle. While nucleation and the early stages of growth clearly occur by direct impingement of acetylene molecules, the later stages for which direct line-of-site to the catalyst surface is no longer possible require that the acetylene molecules find their way through the growing array, with a gradual slowing of the growth rate illustrated in FIG. 8b.

The presence of hydrogen atoms in the C network plays an important role in the stepwise acetylene addition mechanism. In addition to being the active sites for H abstraction, mobile hydrogen atoms play a role in molecular transformations such as carbon ring closure and five-to-six member ring conversion. The high temperature fall-off in the growth of the CNTs occurs in the temperature range where crystallization of H-saturated nanocrystalline graphite was found to expel $H_2$ —a clear indication that desorption-induced H loss is responsible for the termination of CNT growth.

A rising substrate temperature increases the mobility of H atoms within the carbon network and with it the probability for recombinative $H_2$ desorption. The amount of hydrogen present in the growing C network is determined by the dynamic equilibrium between hydrogen desorption and the acetylene incidence rate.

Figure 12A:
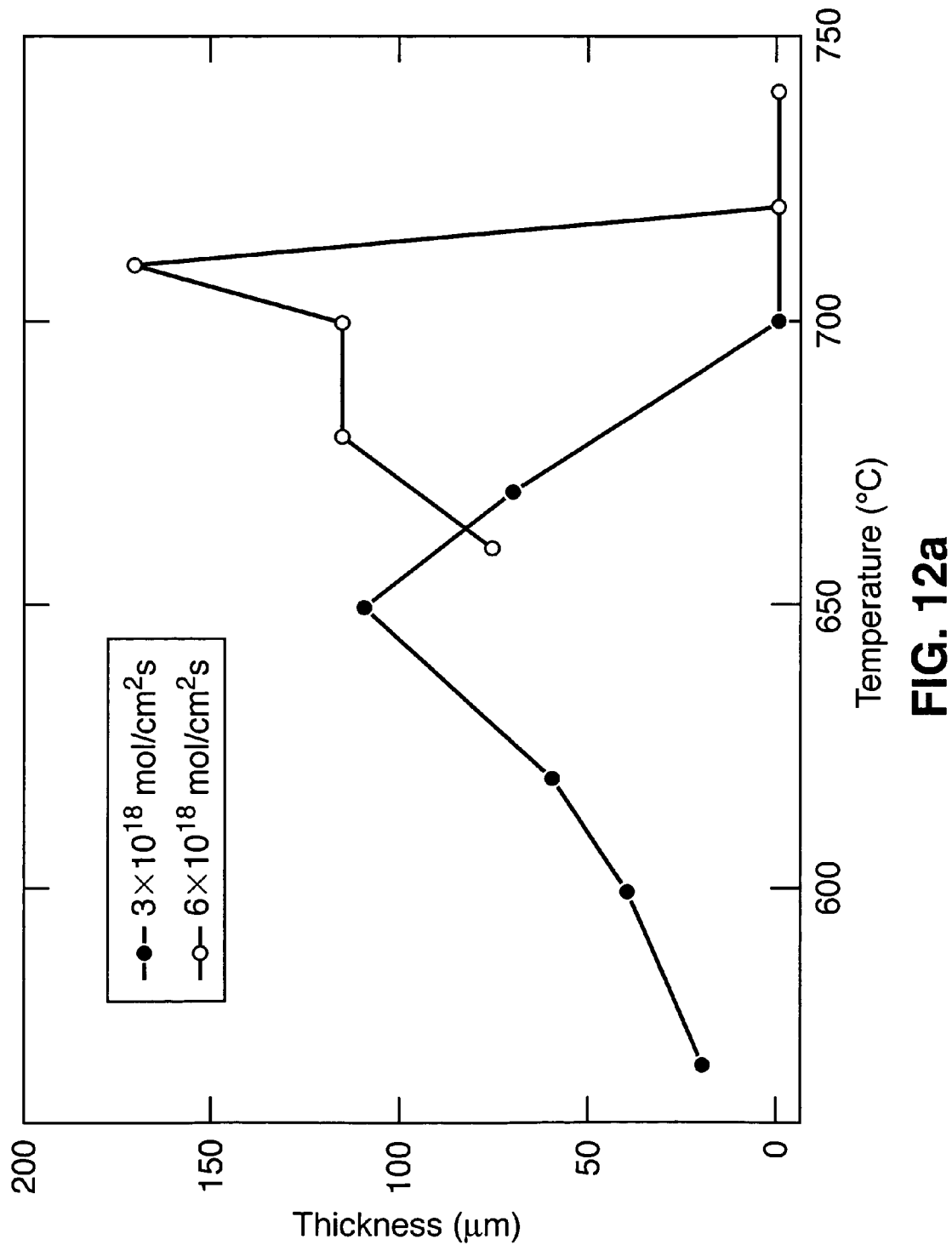
FIG. 12a is a graph showing that a higher incidence rate shifts the growth curve to higher temperatures.
Figure 12B:
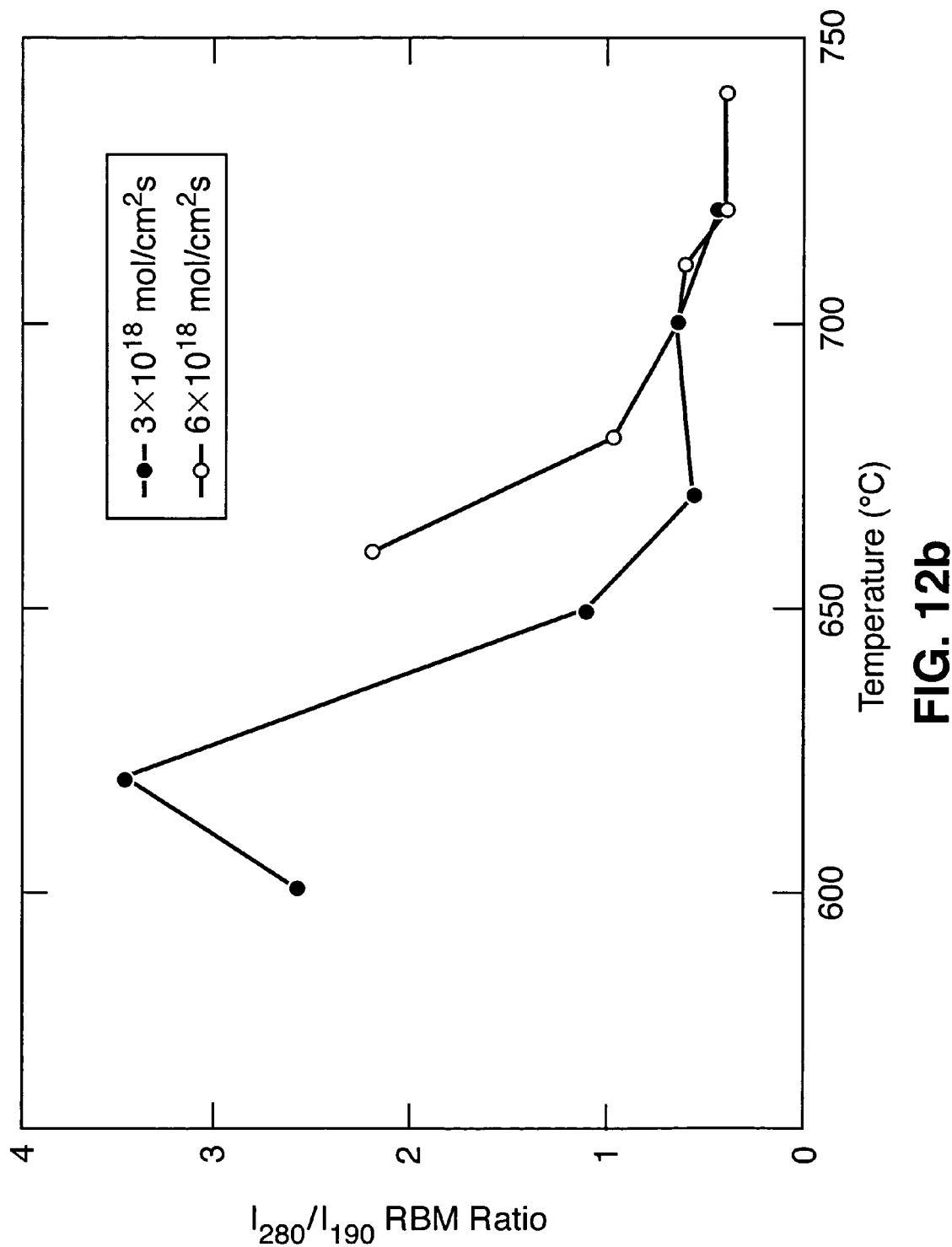
FIG. 12*b* is a graph showing that a higher incidence rate can be used to force nucleation of smaller diameter CNTs at higher temperatures that is manifested by a sharp increase in the $I_{280}/I_{190}$ RBM ratio.

FIGS. 12a and 12b show that shifting of the dynamic equilibrium by increasing the acetylene incidence rate changes both the growth behavior and the characteristics of the CNTs. FIG. 12b shows that higher incidence rates lead to nucleation of smaller diameter CNTs even at increasing substrate temperatures.

Source Gas Studies are provided hereinbelow as examples to aid in the practice of the present invention.

In the search for primary precursors to SWCNT growth a total of twelve C containing source gas molecules were examined. For a summary of the results of the molecular jet CNT growth experiments see Table 1 at the conclusion of the specification. The yield in Table 1 was scaled according to the gas composition, the Raman signal strength, and the density of the deposit determined from the SEM images. Four of the molecules, methane, ethylene, acetylene, and propylene, were small hydrocarbons, two, benzene and xylene were aromatic hydrocarbons, five were oxygen containing organic compounds, and the twelfth compound was CO. The five oxygen containing organic compounds consist of three alcohols, methanol, ethanol and propanol, and acetone and diethylether. The selection of these twelve compounds was not arbitrary. The hydrocarbons were chosen because they are widely used in CNT growth by CVD. Acetone was added to the list because it is a trace impurity in commercial acetylene. Since repeated attempts to remove acetone from acetylene were fruitless, we instead used growth experiments to ascertain what role acetone plays in the acetylene growth experiments. The alcohols were included because of recent reports of successful growth of single wall and VA-SWCNTs from ethanol. CO was included because it is the source gas in the HiPco process for large scale production of CNTs.

The molecular jet CNT growth experiments produced some interesting and unexpected results. All growth experiments were performed using the multilayer metal catalyst system. The small hydrocarbons, except acetylene, either produced small amounts of deposit (propylene) or no deposit (methane, ethylene) at all. The absence of CNT deposition from small hydrocarbons is surprising because these molecules are routinely used in CNT CVD and CVD of other forms of carbon in this temperature range. This trend suggests that the main pathway for C deposition from small hydrocarbons occurs through intermediates that are formed by secondary gas phase reactions, which are suppressed in the molecular beam growth environment. The absence of deposit with benzene and xylene leads us to conclude that the pre-formed hexagonal building block of the benzene ring provides no special advantage in CNT growth. It appears that similarly to pyrolytic carbon deposition by CVD, the benzene ring must transform into other intermediates before CNT growth occurs.

The behavior of small oxygen containing molecules with a comparable number of C atoms as the hydrocarbon molecules is markedly different in CNT growth. In contrast to the hydrocarbons, all the oxygen containing molecules produced SWCNTs. The type of bonding of oxygen to C, alcohol (—OH), ketone (=CO), or ether (—OR) where R represents an alkyl group, does not appear to be a decisive factor. The CNT growth results from the alcohol series show that the size of the alkyl group does not make an observable difference either. The common characteristic of the oxygen containing carbon molecules is that their thermal decomposition occurs by pathways that produce oxygen containing radicals. The mechanism by which oxygen containing radicals enhance CNT growth could not be clarified from the results of these preliminary growth studies. We speculate that similarly to soot formation, the oxygen containing radicals are an efficient vehicle for incorporating C through increased formation of atomic hydrogen which promotes aromatic growth.

In the HiPco process CNTs grow from C that is produced in a gas phase reaction that occurs by collision of two CO molecules resulting in C and $CO_2$. CO is a fairly stable molecule in surface collisions with metals and does not chemisorb and fragment readily at CNT growth temperatures. The molecular jet experiments using CO show that the presence of oxygen alone does not ensure efficient incorporation of C into the carbon network. Molecular jet experiments produced no deposit from CO. The use of CO (2%) along with efficient precursors such as acetylene (2%) had no effect on the outcome of the CNT growth reaction, suggesting that CO is inert even when active growth sites are present on the surface.

As stated above, acetylene proved to be an order of magnitude more efficient in SWCNT growth than the nearest precursor (acetone), and it is several orders of magnitude more efficient than its hydrocarbon cousins. The molecular jet studies demonstrate that acetylene is the principal gas phase species that reacts at the growing CNT surface. However, combinations of precursors, especially involving an acetylene component, may also prove to be useful.

Acetone as the next most efficient precursor warrants special attention because it is an inextricable contaminant in commercially sold acetylene. For safety reasons acetylene is dissolved in liquid acetone in a ratio of 240:1. The amount of acetone present in acetylene increases as the pressure in the cylinder falls. We estimated the amount of acetone by mass spectrometry to be above 1% in a full cylinder. We were unable to find acetone free acetylene for purchase in the US. Evidently it is available in Europe and Canada. Our repeated attempts to remove acetone by a dry ice cold trap or a filter cartridge were fruitless. The solution around this problem was to determine whether acetone enhances or hinders CNT growth. We entrained acetone in a carrier beam using a bubbler. We estimated using mass spectrometry that the concentration of acetone in a saturated carrier gas was 10%. Using the acetone molecular jet, random mats of SWCNTs were grown reproducibly. Occasionally vertically aligned bundles appeared, but the coverage was not continuous as with acetylene. That is why VA-SWCNT growth from acetone was characterized as weak in Table 1. Based on these measurements, we conclude that the effect of acetone on SWCNT and VA-SWCNT growth from acetylene is negligible.

The only remaining question concerning the source gases is what makes acetylene so effective in carbon network formation. Experimental studies and theoretical modeling of soot formation in flames point to the molecular structure of acetylene as the key to efficient propagation of aromatic growth. This reaction mechanism consisting of two steps, H-abstraction and $C_2H_2$-addition is known as the "HACA-mechanism". The first step, abstraction of H, prepares the active site for the addition of acetylene. Molecular mass growth occurs by repeating this two step reaction sequence, and leads to formation of polycyclic aromatic hydrocarbons (PAH). Atomic hydrogen migration along the nascent carbon network is the crucial step that enables molecular rearrangements necessary for formation of PAHs and the transformation of large molecular assemblies into three dimensional PAHs.

The role of several specific examples of hydrogen migration reactions, ring closure, interconversion of five- and six-membered rings, and migration of the cyclopenta rings along zig-zag aromatic edges were explored in soot formation model calculations. Many other reactions of hydrogen migration induced rearrangements similar to these can be envisioned based on the tremendous versatility of C bonding.

Catalyst studies are provided hereinbelow as examples to aid in the practice of the present invention.

The details of the SWCNT growth experiments using different catalyst forms are summarized in Table 2 at the conclusion of the specification. The growth experiments were performed using a 2% acetylene beam in helium and hydrogen. The multilayer metal catalyst films were the main catalyst system in this work. It is a widely held assumption that the onset of CNT growth occurs after the formation of elemental Fe nanoparticles by reduction of the iron oxide in the thin film. The use of this catalyst system with molecular jet growth revealed several unexpected trends that led to the conclusion that the active sites are related to a phase of iron oxide rather than to elemental Fe. It is important to note that heating of the sample to the growth temperature was performed in vacuum, typically at low $10^{-6}$ Torr, in about 5 minutes. No reductive pretreatment of the catalyst films by hydrogen flow was performed.

All freshly deposited catalyst films produced low density, random SWCNT mats. However, not all freshly deposited catalyst films produced VA-SWCNT growth. The efficacy of the metal catalyst films of the same nominal thickness and composition toward VA-SWCNT growth could be ascertained only by performing actual growth experiments. X-ray photoelectron spectroscopy (XPS) measurements of films prior to CNT growth showed no obvious difference between catalyst films that were active and those that were not active for VA-SWCNT growth. Some catalyst films became sufficiently active to produce VA-SWCNT growth after being exposed to ambient air for a few days. Following this observation, we were able to activate inactive catalyst films by prolonged exposure to ozone generated by an UV oven.

The importance of iron oxide for the nucleation of SWCNT growth was further confirmed by the discovery that VA-SWCNT growth markedly improved with weakly active catalyst films in the presence of water vapor and oxygen. The water vapor was introduced by flowing the acetylene mixture through a bubbler containing water. Oxygen was supplied as a separate beam consisting of 20% oxygen in He. The throughput ratio of the source gas to oxygen beam was 5. In a number of experiments the oxygen beam alone with the acetylene beam or the acetylene beam saturated with water vapor alone were less effective than when both were used together.

The pulsed laser deposition (PLD) iron oxide films were deposited with a thickness gradient in a range from 2 Å to 20 Å. The background oxygen pressure and the oxidation kinetics determine the stoichiometry and the phase of iron oxide during PLD deposition. Previous reports show that in a mixture of two different phases present in as deposited iron oxide particle films, $\gamma$-$Fe_2O_3$ is more abundant than $Fe_3O_4$. Because the catalyst-films are heated during CNT growth in a complex background including acetylene, water vapor and oxygen, it is difficult to predict how the initial $FeO_x$ phase changes and what is the catalytically active $FeO_x$ phase.

In a few growth experiments the thinner regions of the $FeO_x$ films were more effective than the thicker regions in SWCNT and VA-SWCNT growth. The thicker regions produced multi wall CNTs and VA-MWCNTs. We speculate that the thinner regions of the $FeO_x$ films were more effective in SWCNT growth because they were easier to fully oxidize to stoichiometric $Fe_2O_3$ during PLD deposition.

The catalyst particle size is an important variable in SWCNT growth. We used two different $Fe_2O_3$ nanoparticle sizes, 3 and 6 nm to explore the correlation between the particle size and the CNT diameters. The $Fe_2O_3$ nanoparticles were used pure without colloidal coating. Low density $Fe_2O_3$ nanoparticles were deposited on a Si wafer from a water solution. The $Fe_2O_3$ nanoparticles independent of their size produced SWCNTs with the acetylene beam both in the presence and absence of water and oxygen. The role of the $Fe_2O_3$ nanoparticle size in determining the CNT diameters was explored as a function of substrate temperature and acetylene incidence rate. The results of the preliminary studies show no clear dependence of the SWCNT diameter on the particle size. These results led us to conclude that SWCNT growth is more sensitive to the composition and the phase, than the size of the iron oxide nanoparticles.

Acetylene incidence rate and substrate temperature are important parameters in single wall carbon nanotube and vertically aligned array growth. The incidence rate of acetylene was varied by changing the nozzle-to-sample distance at fixed reservoir pressure or by changing the reservoir pressure at a fixed nozzle-to-sample distance. With optimally active catalyst films VA-SWCNT growth was observed only above a threshold acetylene incidence rate of $2 \times 10^{18}$ molecules/cm$^2$s. Below this incidence rate we observe low density SWCNT growth in a form of random mats, but free of amorphous carbon deposit and other carbonaceous side products, as can be seen in FIGS. 2a, 2b, 4a, 5a, 5b, 13a, and 13b.

The distribution of acetylene molecules in a molecular jet is a complex function of the expansion conditions and the composition of the gas mixture, but in general, it is a forward peaking distribution described by a $\cos^n\theta$ function, where $n \geq 4$. The height profile of the VA-SWCNT films depicted in the cross section SEM image in FIG. 2a correlates with the variation of the acetylene incidence rate across the growing surface. The dislodged bundles of SWCNTs in the image result from the film being pulled apart after cleaving the Si substrate.

The variation of the VA-SWCNT film characteristics along the CNT length were studied using Raman scans as a function of thickness as seen in FIG. 4a. FIGS. 7a, and 7b show plots of the $I_G/I_D$ ratio along the CNT length for films grown at fixed experimental conditions, but for different time durations in a range from 1 min to 4 hours. A common feature of the thickness plots is a change of the $I_G/I_D$ ratio with increasing film thickness. The growth rate plot in FIG. 10b derived form these data shows that the thickness increases linearly with time before a saturation regime is entered past 2 hours. A growth rate of 2.2 µm/min was determined from the linear growth regime. Using the growth rate, the known incidence rate, and a packing density of the CNT film of 10%, we calculate a 10-2 conversion efficiency of acetylene molecules.

One way that the $I_G/I_D$ ratio along the length of the CNTs can change is by transformation of SWCNTs into MWCNTs by forming of extra outer shells. Other factors that can affect the $I_G/I_D$ ratio include coating of the CNT walls by reaction products or amorphous carbon, and defect incorporation into the CNT walls. We rely on the TEM images of our samples to interpret the falling $I_G/I_D$ ratio. TEM images of a 50 µm and 160 µm thick films grown under similar conditions are compared in FIGS. 5a and 5b.

Because double wall DWCNTs begin to appear in films thicker than 50 µm, we attribute the decay of the $I_G/I_D$ ratio to formation of the extra wall. FIG. 8a depicts time dependent $I_G/I_D$ ratios at the top and near the root of the CNTs that were extracted from the plots in FIGS. 7a and 7b. The $I_G/I_D$ ratio is unchanged at the top of the films, but falls with growth time near the interface with the catalyst, suggesting that the active growth region is located near the root of the growing CNTs. The time-dependent data are in agreement with the thickness dependent scans in FIGS. 7a and 7b, which show that the change in the $I_G/I_D$ ratio occurs within the first 30-50 µm of thickness.

The thickness dependence of the $I_G/I_D$ ratio at a series of growth temperatures is presented in FIGS. 9a and 9b. These plots show that the $I_G/I_D$ ratio increases throughout the films as the temperature increases. The plot in FIG. 6a shows that VA-SWCNT growth occurs in a narrow substrate temperature window in the range from 570° C. to 700° C., with the maximum growth rate at 650° C. The plot of the $I_G/I_D$ ratio in FIG. 6b shows that high quality CNT growth persists past 700° C. where aligned growth ceases. The plot in FIG. 6b also shows that the ratio of the RBM peak intensity ($I_{280}/I_{190}$) at 280 and 190 cm$^{-1}$ falls with increasing temperature. The interpretation of this trend depends on the assignment of the 280 cm$^{-1}$ RBM peak. The 280 cm$^{-1}$ RBM peak may be assigned to small diameter SWCNTs, or to the inner tubes in DWCNTs.

Since we observe both SWCNTs and DWCNTs in TEM images as discussed above, the possibility that the 280 cm$^{-1}$ RBM peak is related to DWCNTs must be considered. According to this assignment, the decrease of the $I_{280}/I_{190}$ ratio implies that DWCNTs can be suppressed by increasing the substrate temperature at a fixed incidence rate. Alternatively, the decrease in the $I_{280}/I_{190}$ ratio can be interpreted as the temperature induced increase of the CNT diameters.

Plots of the $I_G/I_D$ ratio as a function of film thickness for a range of incidence rates, but otherwise fixed growth conditions is shown in FIGS. 10a and 10b. This plot reveals that the onset of vertically aligned growth occurs at an incidence rate of $2 \times 10^{18}$ acetylene molecules/cm$^2$s. Below this incidence rate high quality, but not aligned SWCNTs represented by symbols only in FIGS. 10a and 10b grow. Above this incidence rate the film thickness increases roughly linearly with the incidence rate, as seen in FIG. 6d.

The plots in FIGS. 10a and 10b show that at fixed temperature the $I_G/I_D$ ratio throughout the films decreases with increasing incidence rate. However, when the Raman signal is collected from the top of the films, the $I_G/I_D$ ratio increases with incidence rate, as seen in FIG. 6c. These trends are difficult to reconcile because they seem to contradict each other. The Raman signal from the top is representative of the SWCNTs grown in the early stages of growth and the rising $I_G/I_D$ ratio implies that these CNTs improve with higher incidence rate. In contrast, the data in FIGS. 10a and 10b suggest that the SWCNTs in the bulk of the films are adversely affected by higher incidence rates. The most interesting trend is the increase of the $I_{280}/I_{190}$ RMB ratio with the incidence rate depicted in FIG. 6c. This trend implies that the fraction of small diameter CNTs increases with the incidence rate. However, from these data alone it is not possible to determine whether these smaller tubes are SWCNTs, or small inner CNTs in DWCNTs. These trends emphasize the importance of advanced growth capabilities for controlling CNT characteristics.

The plots of the evolution of the $I_G/I_D$ ratio with thickness in FIGS. 7a and 7b show that the onset of the changes is gradual, they occur independent of the length of CNTs, and level off after about 50 µm. The gradual onset of the $I_G/I_D$ ratio decay implies that the second wall develops after SWCNTs nucleated and started growing. The plots in FIGS. 10a and 10b reveal that the likelihood for the formation of the second wall increases with the incidence rate, and the plots in FIGS. 9a and 9b show that the second wall formation can be suppressed by increasing the substrate temperature. These data suggest a preference for nucleation of SWCNTs. However, under fast growth conditions formation of the second wall can start at imperfect bonding sites and propagate along with the first wall. This process seems to be self limiting and protects from formation of additional walls, because triple wall tubes were rarely observed in the TEM images.

Stepwise acetylene addition mechanism and the role of hydrogen desorption are important factors and should be considered in carrying out the present invention. Therefore, this additional discussion is included to aid in the practice of the present invention. The details of the mechanism of SWCNT growth that are described hereinabove are not fully understood and can be debatable; however it is generally accepted that the extension of the CNT length occurs after formation of a CNT cap. When molecular species are used as the source of C, these steps obviously must be preceded by the fragmentation and decomposition of the C containing molecules. The molecular structure of the C containing molecules and the decomposition mechanism have been routinely ignored in CVD growth of CNTs because according to the diffusion model the rate limiting step is C diffusion through the molten metal particle. The rate of SWCNT growth according to the diffusion model should increase with the temperature. The data described hereinabove from our experiments is clearly at odds with the diffusion model.

Here we outline a growth model for low temperature growth of SWCNTs that is based on sequential addition of acetylene molecules. Note that in contrast to the diffusion model, which totally ignores the extraordinary ability of C to form complex bonding arrangements and rearrangements, our model is based on the versatility of C chemistry. The basic reaction sequence of the HACA mechanism for stepwise acetylene addition has already been discussed hereinabove. This mechanism comprises the following reaction steps: H-abstraction, acetylene addition, cyclization of five- and/or six-membered adducts, dehydrogenation and ring closure, and intramolecular rearrangement. Maintaining efficient radical formation is the key to the continuation of this process.

Oxygen and OH are known promoters of aromatic ring formation by creation of atomic hydrogen. We observe substantial improvement in VA-SWCNT growth especially with poorly active catalyst films when water vapor and oxygen are concurrently supplied with acetylene. The role of the iron oxide surface in the initial phase of the growth is to perform oxidative dehydrogenation of the impinging acetylene molecules. Polyacetylene chains and small ring structures that form from the acetylene radicals remain attached to the surface.

Studies of PAH structures in gas phase found that stable $C_nH_x$ molecules occur as chains for n=5-22. The first evidence of a ring structure was found for $C_{15}H_4$. The sequential acetylene addition described by the HACA mechanism combines with oxidative dehydrogenation to build a disordered web-like carbon network. The formation of a curved nucleus including a combination of pentagons and hexagons is energetically more favorable than the formation of a flat graphitic sheet. The curved nuclei remain attached to the catalyst surface and to the disordered web-like network. Extension of the CNTs occurs at the base by incorporation of C from the disordered web-like network. The disordered web-like network is continuously replenished by acetylene addition from the impinging beam.

The presence of atomic hydrogen in the growing C network is important to three dimensional C network formation by sequential addition of acetylene. The migration of atomic hydrogen from C atoms in benzene rings to the C atoms in the side chains enables molecular rearrangement reactions such as ring closure and five-to-six member ring conversion. These molecular rearrangement reactions facilitate C incorporation and the extension of the CNT. We attribute the high temperature roll off in the CNT growth to hydrogen loss from the growing network.

Recent $H_2$ desorption studies from mechanically prepared, H-saturated nanostructured graphite show that recrystallization results in expulsion of H from the graphitic network. The onset of $H_2$ desorption corresponding to recrystallization of nanostructured graphite occurs at 670° C. Note that the roll off in the VA-SWCNT film thickness in FIG. 6a starts at 650° C. The amount of hydrogen in the growing network is determined by a dynamic equilibrium between the $H_2$ desorption rate and the incidence rate. A higher incidence rate of acetylene should compensate for H loss at higher temperatures and shift the dynamic equilibrium and the CNT growth process toward higher temperatures.

FIG. 12a shows that increasing the incidence rate of acetylene shifts the CNT growth curve to higher temperatures. A higher incidence rate leads to nucleation of smaller diameter tubes even at higher temperatures as shown in FIG. 12b. Note that we already showed in FIG. 6c that the CNT diameters decrease with incidence rate at fixed substrate temperature. These trends are important because they show that factors other than the particle size can play an important role in determining the CNT diameter.

Since it is apparent that the onset of CNT growth occurs by cap formation, then incorporation of C for the growth of the CNTs must occur at the base of the CNTs.

Figure 13B:
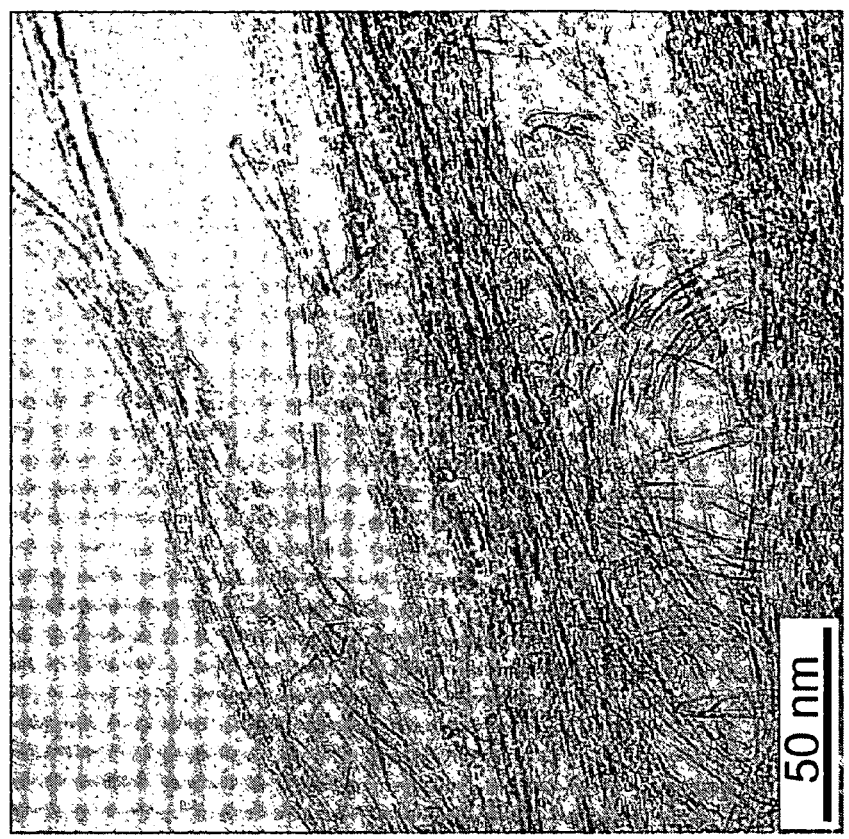
FIG. 13*b* is a TEM image of a large field of view illustrating the absence of catalyst particles.
Figure 13A:
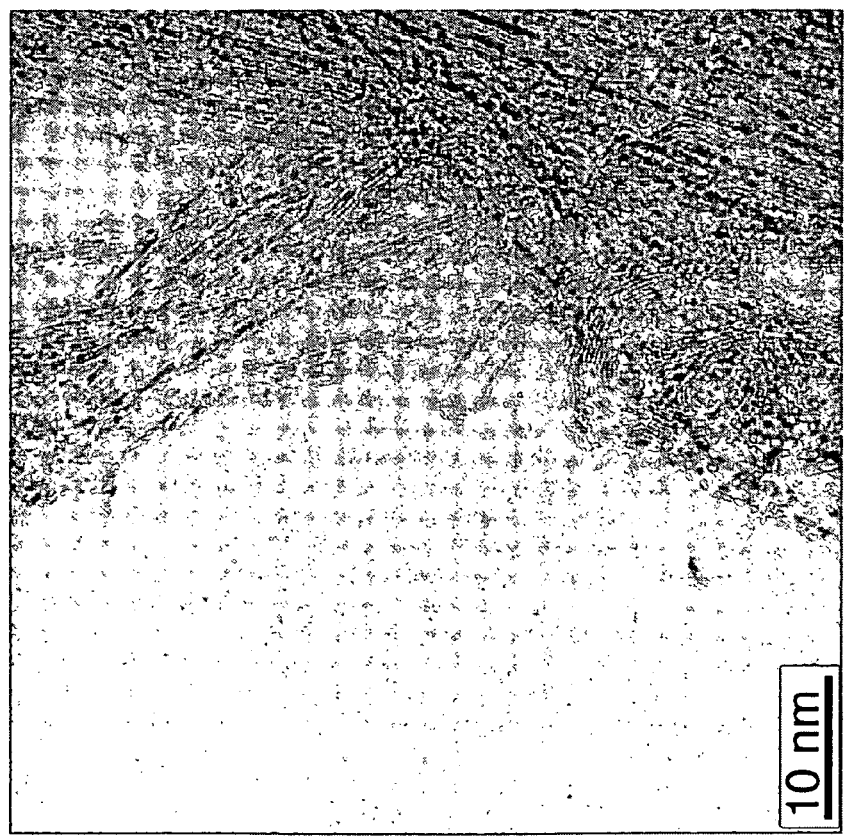
FIG. 13*a* is a TEM image showing two SWCNTs terminated by caps.

Such a growth mechanism is commonly referred to as the root growth mechanism and it requires that the CNT tips be terminated by a fullerene cap and not by a catalyst particle. We routinely observe capped SWCNTs in TEM images of our samples (two can be clearly seen in FIG. 13a). The TEM image in FIG. 13b shows a large field of view and confirms that there are no particles and particle terminated SWCNTs in our samples.

Additional data supporting a root growth mechanism are shown in FIG. 8a; the $I_G/I_D$ ratio is roughly unchanged at the top of the growing film and it decays at the interface with the catalyst particle. These data combined with TEM images of capped CNTs present a strong argument that the active region during growth is located at the root of the growing CNTs.

A clear practical advantage of molecular jet growth is that the carbon nanotubes are attached to a substrate and are already vertically aligned. The substrate can be patterned to produce selective area growth for device structures that are used in field emitter arrays. Bulk production of CNTs can be implemented by harvesting the CNTs from the substrates. The nanotube material is already aligned rendering post processing unnecessary.

The present invention brings advanced control capabilities that can be used to control all characteristics of the CNTs. The unprecedented control capabilities are related to the fact that material growth is accomplished from a molecular flow at a single collision level instead of bulk gas flow such as in conventional CVD. Molecular level control is essential for controlling the type (single-wall, double-wall, multi-wall, etc.), the diameter, the length, the orientation, and even the chirality of the carbon nanotubes. Control of these CNT characteristics is essential because they determine the CNT properties and consequently their use in practical applications.

Direct growth of several mm long vertically aligned single wall carbon nanotubes enables advanced carbon nanotube applications in composite materials and fibers. Moreover, direct growth of long single wall CNTs eliminates the need for spinning the loose CNT material into fibers as it is done now.

The versatile control capabilities of molecular jets can be used to control the outcome of the synthesis reaction and produce other types of CNTs and other forms of carbon deposits. The molecular jet growth environment is not limited to carbon. A wide range of nanostructures of other materials can be grown by using this controlled molecular assembly process.

The ability to directly fabricate vertically aligned single wall carbon nanotubes simplifies field emission device manufacturing. Single wall carbon nanotubes are regarded as more perfect and have fewer defects than multi-wall carbon nanotubes and are preferred over multi-wall CNTs in many applications.

The present invention has the potential to optimize the growth process for direct growth of sufficiently long bundles of single wall CNTs that can be used as conductors for low loss electrical power transmission.

While there has been shown and described what are at present considered the preferred embodiments of the invention, it will be obvious to those skilled in the art that various changes and modifications can be prepared therein without departing from the scope of the inventions defined by the appended claims.

Table 1 and Table 2 follow:

TABLE 1

| Carbon Source | Chem. Formula | Carrier Gas | Temperature | Deposit | MWCNT | SWCNT | Yield | VA-SWCNT |
|---|---|---|---|---|---|---|---|---|
| Methane[2] | $CH_4$ | 10% $H_2$, 88% He | 540-740° C. | N | — | — | — | — |
| Ethylene[2] | $C_2H_4$ | 10% $H_2$, 88% He | 650° C. | N | — | — | — | — |
| Acetylene[2] | $C_2H_2$ | 10% $H_2$, 88% He | 540-740° C. | Y | N | Y | 10 | Strong |
| Propylene[2] | $CH_3CHCH_2$ | 10% $H_2$, 88% He | 540-740° C. | Y | Y | Y | 0.1 | NO |
| Benzene[1] | $C_6H_6$ | 10% $H_2$, 90% He | 650° C. | N | — | — | — | — |
| Xylene[1] | $C_6H_4(CH_3)_2$ | 10% $H_2$, 90% He | 650° C. | N | — | — | — | — |
| Acetone[1] | $CH_3COCH_3$ | 10% $H_2$, 90% He | 540-740° C. | Y | N | Y | 1 | Weak |
| Diethylether[1] | $C_2H_5OC_2H_5$ | 10% $H_2$, 90% He | 650° C. | Y | N | Y | 0.5 | NO |
| Methanol[1] | $CH_3OH$ | 10% $H_2$, 90% He | 650° C. | Y | N | Y | 0.5 | NO |
| Ethanol[1] | $CH_3CH_2OH$ | 10% $H_2$, 90% He | 540-740° C. | Y | N | Y | 0.5 | NO |
| Propanol[1] | $CH_3CH_2CH_2OH$ | 10% $H_2$, 90% He | 650° C. | Y | N | Y | 0.5 | NO |
| Carbon Monoxide[2] | CO | 10% $H_2$, 88% He | 540-740° C. | N | — | — | — | — |

MWCNT = multi wall carbon nanotube,
SWCNT = single wall carbon nanotube,
VA-SWCNT = vertically aligned SWCNT
[1]Entrained in carrier gas using a bubbler. The incidence rate is determined by the room temperature vapor pressure.
[2]These experiments were performed in a range of incidence rates from $1.5 \times 10^{18}$ to $5.3 \times 10^{18}$ molecules/$cm^2$s.
Temperature refers to the temperature of the substrate.

TABLE 2

| Catalyst | Form | Preparation | Composition | SWCNT | MWCNT | VA-SWCNT |
|---|---|---|---|---|---|---|
| Fe | Multilayer Metal Film | E-beam Evapoaration | 100 Å Al, 10 Å Fe | Y | Y | Y |
| $FeO_x$ | Gradient Thin Film | Pulsed Laser Deposition | 2 Å-20 Å Thickness Range | Y | Y | Y |
| $Fe_2O_3$ | Nanoparticles | Chemical Synthesis | 30 Å, 60 Å Low Density | Y | N | — |

What is claimed is:

1. A method of growing an array of essentially vertically aligned carbon nanotubes comprising the step of impinging a beam of acetylene molecules on to a substrate to effect an acetylene incidence rate ranging from about $1.5 \times 10^{18}$ molecules/$cm^2$ per second to about $5.3 \times 10^{18}$ molecules/$cm^2$ per second to grow a continuous array of essentially vertically aligned carbon nanotubes on an entire deposition surface of the substrate at a growth temperature ranging from about 540° C. to about 740° C., wherein the acetylene incidence rate provides a crowding effect between adjacent carbon nanotubes during growth that results in vertical orientation of the array of essentially vertically aligned carbon nanotubes.

2. The method of claim 1 wherein said substrate comprises Si.

3. The method of claim 1 wherein said substrate further comprises an Fe-containing catalyst coating upon which said beam of carbon-containing molecules is impinged.

4. The method claim 1 wherein said carbon nanotubes comprise single wall carbon nanotubes.

5. A method of growing an array of essentially vertically aligned carbon nanotubes comprising the step of impinging a beam of acetylene molecules on to a substrate to effect an acetylene incidence rate is at least about $2.0 \times 10^{18}$ molecules/$cm^2$ per second to grow a continuous array of essentially vertically aligned carbon nanotubes on an entire deposition surface of the substrate, at a growth temperature ranging from about 540° C. to about 740° C.

6. The method of claim 5, wherein the acetylene incidence rate is at least about $3.0 \times 10^{18}$ molecules/$cm^2$ per second to grow an array of essentially vertically aligned carbon nanotubes on the substrate.

7. A method of growing an array of essentially vertically aligned carbon nanotubes comprising the step of impinging a beam of acetylene molecules on to a substrate to effect an acetylene incidence rate ranging from about $1.5 \times 10^{18}$ molecules/$cm^2$ per second to about $5.3 \times 10^{18}$ molecules/$cm^2$ per second to grow an array of essentially vertically aligned carbon nanotubes providing continuous surface coverage of the substrate at a growth temperature ranging from about 540° C. to about 740° C., wherein the acetylene incidence rate provides a crowding effect between adjacent carbon nanotubes during growth that results in vertical orientation of the array of essentially vertically aligned carbon nanotubes.

* * * * *